US012733642B2

(12) United States Patent
Mundhra et al.

(10) Patent No.: US 12,733,642 B2
(45) Date of Patent: Sep. 15, 2026

(54) INSECTICIDAL COMPOSITIONS COMPRISING OF DIAMIDE AND TETRAMIC ACID COMPOUND

(71) Applicant: WILLOWOOD CHEMICALS LIMITED, New Delhi (IN)

(72) Inventors: Parikshit Mundhra, New Delhi (IN); Jitendra Mohan, New Delhi (IN)

(73) Assignee: WILLOWOOD CHEMICALS LIMITED, New Delhi (IN)

( * ) Notice: Subject to any disclaimer, the term of this patent is extended or adjusted under 35 U.S.C. 154(b) by 409 days.

(21) Appl. No.: 18/289,465

(22) PCT Filed: May 5, 2022

(86) PCT No.: PCT/IN2022/050432
§ 371 (c)(1),
(2) Date: Nov. 3, 2023

(87) PCT Pub. No.: WO2022/234595
PCT Pub. Date: Nov. 10, 2022

(65) Prior Publication Data

US 2024/0237651 A1 Jul. 18, 2024

(30) Foreign Application Priority Data

May 6, 2021 (IN) ............................ 202111020722

(51) Int. Cl.

| | |
|---|---|
| ***A01N 43/56*** | (2006.01) |
| ***A01N 25/04*** | (2006.01) |
| ***A01N 41/10*** | (2006.01) |
| ***A01N 43/80*** | (2006.01) |
| ***A01N 43/88*** | (2006.01) |
| ***A01N 47/06*** | (2006.01) |
| ***A01N 53/00*** | (2006.01) |
| ***A01P 1/00*** | (2006.01) |
| ***A01P 7/02*** | (2006.01) |
| ***A01P 7/04*** | (2006.01) |

(52) U.S. Cl.
CPC ............ *A01N 43/56* (2013.01); *A01N 25/04* (2013.01); *A01N 41/10* (2013.01); *A01N 43/80* (2013.01); *A01N 43/88* (2013.01); *A01N 47/06* (2013.01); *A01N 53/00* (2013.01); *A01P 1/00* (2021.08); *A01P 7/02* (2021.08); *A01P 7/04* (2021.08)

(58) Field of Classification Search
CPC ..................................................... A01N 43/56
See application file for complete search history.

(56) References Cited

U.S. PATENT DOCUMENTS

2015/0296773 A1* 10/2015 Hellwege ............... A01N 47/22
514/250

FOREIGN PATENT DOCUMENTS

| | | |
|---|---|---|
| CN | 102293218 A | 12/2011 |
| CN | 102308816 A | 1/2012 |
| CN | 104273157 A | 1/2015 |
| CN | 106342875 A | 1/2017 |

OTHER PUBLICATIONS

Khan et al. Pest Management Science, 2017, 73(12): 2465-2472.*
International Search Report from corresponding PCT Application PCT/IN2022/050432, dated Dec. 8, 2022.
Written Opinion from corresponding PCT Application PCT/IN2022/050432, dated Dec. 8, 2022.

* cited by examiner

*Primary Examiner* — Rei Tsang Shiao
(74) *Attorney, Agent, or Firm* — Harness Dickey & Pierce P.L.C.

(57) ABSTRACT

The present provides a synergistic insecticidal composition comprising Chlorantraniliprole, Spirotetramat and at least one insecticidal compound selected from Buprofezin, Bifenthrin, Propargite or Pyriproxyfen, process of preparation of the composition and uses thereof.

10 Claims, No Drawings

INSECTICIDAL COMPOSITIONS COMPRISING OF DIAMIDE AND TETRAMIC ACID COMPOUND

PRIORITY STATEMENT

This application is a national stage application under 35 U.S.C. § 371 of PCT International Application No. PCT/IN2022/050432, which has an international filing date of 5 May 2022 and claims priority under 35 U.S.C. § 119 to India Patent Application No. 202111020722 filed on 6 May 2021. The contents of each application recited above are incorporated herein by reference in their entirety.

FIELD OF THE INVENTION

The present invention relates to an insecticidal composition comprising Chlorantraniliprole, Spirotetramat and at least one insecticidal compound selected from Buprofezin, Bifenthrin, Propargite or Pyriproxyfen. The present invention also provides the process of preparation of the composition and uses thereof.

BACKGROUND OF THE INVENTION

In economically important crops, higher crop efficiency is achieved by controlling the invertebrate pests. Invertebrate pest causes damage to growing and stored agronomic crops and thereby result in significant reduction in the crop productivity. Therefore, the control of invertebrate pests is economically important for the enhanced crop productivity. Many products are available as solo or in combinations of two or more active ingredients. However, more economically efficient and ecologically safe insecticidal composition and methods are still being sought.

PCT publication no. WO/2008/125362 discloses a method for improving the use of the production potential of a transgenic plant with an effective amount of a mixture of at least one compound of formula I (i.e. chlorantraniliprole) and at least one compound of the group II. The Group II compound is to be selected from a laundry list. All the examples provide binary combination.

In order to reduce the risk from increased number of resistant pest strains, mixtures of different active compounds are nowadays employed for controlling harmful pests. By combining different active compounds having different mechanisms of action, it is possible to effectively control pests of different groups over a relatively longer period of time and preventing development of resistance. However, this requires continuous development of an effective composition with different active compounds, so as to avoid selection to the particular mechanism of action.

Therefore, there exist a need in the art to develop an insecticidal composition, which is stable, synergistic, broad spectrum, environmentally safe and effective in control of a wide spectrum of insect pests in crops. The insecticidal compositions must show a broader scope of activity to avoid or to prevent the development of resistant varieties of strains to the active ingredients or to the mixtures of known active ingredients used by farmer while minimising the doses of chemicals sprayed in the agriculture fields.

As a solution to the above mentioned problems, the inventors of the present invention surprisingly found that composition comprising Chlorantraniliprole, Spirotetramat and at least one insecticidal compound selected from Buprofezin, Bifenthrin, Propargite or Pyriproxyfen provides effective control of a wide spectrum of insect pests.

SUMMARY OF THE INVENTION

Accordingly, the present invention provides a combination comprising of Chlorantraniliprole, Spirotetramat and at least one insecticidal compound selected from Buprofezin, Bifenthrin, Propargite or Pyriproxyfen, and one or more excipients.

In an embodiment, the composition according to the present invention comprises Chlorantraniliprole in an amount in the range from 1.00 to 15.00% w/w, Spirotetramat in an amount in the range from 5.0 to 30.00% w/w; and at least one compound selected from Buprofezin, Bifenthrin, Propargite or Pyriproxyfen present in an amount of 0.1 to 50% w/w. In another embodiment, Buprofezin in an amount in the range from 5.0 to 30.0% w/w, Bifenthrin in an amount in the range from 2.5 to 25.0% w/w, Propargite in an amount in the range from 20.0 to 50.0% w/w or Pyriproxyfen in an amount in the range from 5.0 to 20.0% w/w.

In a preferred embodiment, the composition of the present invention is selected from a group comprising:

a. 6% w/w of Chlorantraniliprole, 12% w/w of Spirotetramat; 10% w/w of Buprofezin and one or more excipients;
b. 3% w/w of Chlorantraniliprole, 6% w/w of Spirotetramat; 20% w/w of Buprofezin and one or more excipients;
c. 6% w/w of Chlorantraniliprole, 12% w/w of Spirotetramat; 10% w/w of Bifenthrin and one or more excipients;
d. 6% w/w of Chlorantraniliprole, 12% w/w of Spirotetramat; 50% w/w of Propargite and one or more excipients; and
e. 6% w/w of Chlorantraniliprole, 12% w/w of Spirotetramat; 10% w/w of Pyriproxyfen and one or more excipients.

In one another embodiment, the composition is formulated as Capsule suspension (CS), Dispersible concentrate (DC), Dustable powder (DP), Powder for dry seed treatment (DS), Emulsifiable concentrate (EC), Emulsifiable granule (EG), Emulsion water-in-oil (EO), Emulsifiable powder (EP), Emulsion for seed treatment (ES), Emulsion oil-in-water (EW), Flowable concentrate for seed treatment (FS), Granules (GR), Micro-emulsion (ME), Oil-dispersion (OD), Oil miscible flowable concentrate (OF), Oil miscible liquid (OL), Oil dispersible powder (OP), Suspension concentrate (SC), Suspension concentrate for direct application (SD), Suspo-emulsion (SE), Water soluble granule (SG), Soluble concentrate (SL), Spreading oil (SO), Water soluble powder (SP), Water soluble tablet (ST), Ultra-low volume (ULV) suspension, Tablet (TB), Ultra-low volume (ULV) liquid, Water dispersible granules (WG/WDG), Wettable powder (WP), Water dispersible powder for slurry seed treatment (WS), Water dispersible tablet (WT), a mixed formulation of CS and SC (ZC) or a mixed formulation of CS and SE (ZE), a mixed formulation of CS and EW (ZW). In a preferred embodiment, the composition is formulated as SC and SE.

In yet another embodiment, the excipient is selected from the group comprising of dispersing agent present in an amount in the range from 2 to 10% w/w, wetting agent present in an amount in the range from 1 to 5% w/w, emulsifier present in an amount in the range from 2 to 7% w/w, anti-freeze agent present in an amount in the range from 1 to 10% w/w, defoamer present in an amount in the range from 0.01 to 0.5% w/w, biocide present in an amount in the range from 0.01 to 0.5% w/w, thickener present in an amount in the range from 0.01 to 0.5% w/w, and solvent present in an amount in the range from 5 to 25% w/w.

In an embodiment, the dispersing agent is selected from the group comprising of amine salt of phosphate tristyryl phenol ethoxylated, acrylic copolymer, acrylic graft copolymer, salt of naphthalene sulphonate, naphthalene sulfonate formaldehyde condensate, phosphate ester, salt of polycarboxylate, alcohol block copolymer, ethoxylated polyarylphenol phosphate ester, tristyrylphenol ethoxylate phosphate ester, or a combination thereof.

In an embodiment, the wetting agent is selected from the group comprising of ethoxylated polyarylphenol phosphate ester, dioctyl sulphosuccinate, non-ionic ethoxylate, alkylarylpolyglycol ether, castor oil ethoxylate or a combination thereof.

In an embodiment, the emulsifier is selected from the group comprising of polyethylene oxide block copolymer, high molecular weight polymer (polyvinyl alcohol), PEG-10 PPG-5 cetyl phosphate, ethylene oxide (EO)-polyethylene oxide (PO) block copolymer, tristyryl phenol, ethoxylated nonionic emulsifier, castor oil ethoxylates, blend of non-ionic-anionic emulsifiers or a combination thereof.

In an embodiment, the anti-freeze agent is selected from the group comprising of glycerol, propylene glycol, diethylene glycol, monoethylene glycol or a combination thereof.

In an embodiment, the defoamer is selected from the group comprising of silicon emulsion, dimethyl polysiloxane emulsion, polysiloxane emulsion or a combination thereof.

In an embodiment, the biocide is selected from the group comprising of 20% aqueous dipropylene glycol solution of 1, 2-benzisothiazolin-3-one, formaldehyde, isothiazolinone or a combination thereof.

In an embodiment, the thickener is xanthan gum, welan gum, guar gum, polyvinyl alcohol, carboxymethylcellulose, polyvinylpyrrolidone, carboxyvinyl polymer, acrylic polymer, starch derivative or polysaccharide, high purity silica, white carbon or a combination thereof.

In an embodiment, the solvent is selected from the group comprising of naphtha, butan-1-ol, xylene, decanamide, N-methyl-2-pyrrolidone, dimethyl sulfoxide, solvent C9, water or a combination thereof.

DETAILED DESCRIPTION OF THE INVENTION

The definitions provided herein below for the terminologies used in the present disclosure are for illustrative purpose only and in no manner limit, the scope of the present invention disclosed in the present disclosure.

Unless defined otherwise, all technical and scientific terms used herein have the same meaning as commonly understood by one of ordinary skill in the art to which the invention pertains. Although other methods and materials similar, or equivalent, to those described herein can be used in the practice of the present invention, the preferred materials and methods are described herein.

It is to be noted that, as used in the specification and the appended claims, the singular forms "a", "an" and "the" include plural referents unless the context clearly dictates otherwise. Thus, for example, reference to a composition containing "a compound" includes a mixture of two or more compounds. It should also be noted that the term "or" is generally employed in its sense including "and/or" unless the content clearly dictates otherwise.

As used herein, the terms "comprises", "comprising", "includes", "including", "has", "having", "contains", "containing", "characterized by" or any other variation thereof, are intended to cover a non-exclusive inclusion, subject to any limitation explicitly indicated. For example, a composition, mixture, process or a method that comprises a list of elements is not necessarily limited to only those elements but may include other elements not expressly listed or inherent to such composition, mixture, process or method.

The transitional phrase "consisting of" excludes any element, step or ingredient not specified. If in the claim, such would close the claim to the inclusion of materials other than those recited except for impurities ordinarily associated therewith. When the phrase "consisting of" appears in a clause of the body of a claim, rather than immediately following the preamble, it limits only the element set forth in that clause; other elements are not excluded from the claim as a whole.

As used herein, the terms "composition" or "formulation" can be used interchangeably, unless stated otherwise, is meant to encompass, and are not limited to, compositions or formulations containing the combination of Chlorantraniliprole, Spirotetramat and at least one insecticidal compound selected from Buprofezin, Bifenthrin, Propargite or Pyriproxyfen.

The expression of various quantities in terms of "% w/w" or "%" means the percentage by weight, relative to the weight of the total solution or composition unless otherwise specified.

The term "active ingredient", "(a.i.)" or "active agent" used herein refers to that component of the composition responsible for control of insect pests.

As used herein, the term "excipients" or "additive(s)" refers to inert substances which are commonly used as diluent, to provide stability or to increase the activity profile of the composition or formulation without having any agrochemical activity or direct effect on the insect pests.

The term "active ingredient" (a.i.) or "active agent" or "active substance" used herein refers to that component of the composition responsible for control of insect pests.

As used herein, the term "insecticide", refers to any chemical substance used to destroy/kill, inhibit or otherwise adversely affect the insect pests.

As used herein, the term "Chlorantraniliprole" encompasses its agrochemically acceptable salt(s), derivative(s) or any other modified form of Chlorantraniliprole. Chlorantraniliprole belongs to the class of diamide insecticide. It acts by activation of ryanodine receptors, leading to loss of internal calcium stores.

As used herein, the term "Spirotetramat" encompasses its agrochemically acceptable salt(s), polymorph(s), derivative(s) or any other modified form of Spirotetramat. It affects lipid biosynthesis through inhibition of acetyl COA carboxylase, acting mainly after ingestion but also on contact, affecting eggs and larvae, with additional effects on adult fecundity. After penetrating the leaves, it is de-esterified, and transported within both the xylem and phloem. It also has translaminar activity.

As used herein, the term "Buprofezin" encompasses its agrochemically acceptable salt(s), derivative(s) or any other modified form of Buprofezin. Buprofezin is a chitin synthesis inhibitor, type 1 (Homopteran), with subsequent effects on cuticle deposition. It also has effects on the hormone levels of nymphs associated with moulting and prostaglandin synthesis.

As used herein, the term "Bifenthrin" encompasses its agrochemically acceptable salt(s), derivative(s) or any other modified form of Bifenthrin. It belongs to the class of pyrethroid insecticide. It acts on the nervous system of insects by disturbing the function of neurons by interaction with the sodium channel.

As used herein, the term "Propargite" encompasses its agrochemically acceptable salt(s), derivative(s) or any other modified form of Propargite. It belongs to the class of sulfite ester insecticide. It is a non-systemic acaricide with predominantly contact action and some additional action by inhalation. Propargite inhibits mitochondrial ATPase, which results in interruption of normal mite metabolism and respiration.

As used herein, the term "Pyriproxyfen" encompasses its agrochemically acceptable salt(s), derivative(s) or any other modified form of Pyriproxyfen. It belongs to the class of juvenile hormone mimic. It acts as an insect juvenile hormone analogue that inhibits insect maturation processes.

The present invention provides a synergistic compositions comprising of Chlorantraniliprole, Spirotetramat and at least one insecticidal compound selected from Buprofezin, Bifenthrin, Propargite or Pyriproxyfen.

It has been surprisingly found that composition comprising of Chlorantraniliprole, Spirotetramat and at least one insecticidal compound selected from Buprofezin, Bifenthrin, Propargite or Pyriproxyfen not only provides effective control of insect pests but also such combination is synergistic in nature.

In another embodiment, the composition according to the present invention comprises Chlorantraniliprole in an amount in the range from 1.00 to 15.00% w/w, Spirotetramat in an amount in the range from 5.0 to 30.00% w/w; and at least one compound selected from Buprofezin, Bifenthrin, Propargite or Pyriproxyfen present in an amount of 0.1 to 50% w/w. In another embodiment, Buprofezin in an amount in the range from 5.0 to 30.0% w/w, Bifenthrin in an amount in the range from 2.5 to 25.0% w/w, Propargite in an amount in the range from 20.0 to 50.0% w/w or Pyriproxyfen in an amount in the range from 5.0 to 20.0% w/w.

In a preferred embodiment, the composition of the present invention is selected from a group comprising:

a. 6% w/w of Chlorantraniliprole, 12% w/w of Spirotetramat; 10% w/w of Buprofezin and one or more excipients;
b. 3% w/w of Chlorantraniliprole, 6% w/w of Spirotetramat; 20% w/w of Buprofezin and one or more excipients;
c. 6% w/w of Chlorantraniliprole, 12% w/w of Spirotetramat; 10% w/w of Bifenthrin and one or more excipients;
d. 6% w/w of Chlorantraniliprole, 12% w/w of Spirotetramat; 50% w/w of Propargite and one or more excipients; and
e. 6% w/w of Chlorantraniliprole, 12% w/w of Spirotetramat; 10% w/w of Pyriproxyfen and one or more excipients.

In one another embodiment, the composition is formulated as Capsule suspension (CS), Dispersible concentrate (DC), Dustable powder (DP), Powder for dry seed treatment (DS), Emulsifiable concentrate (EC), Emulsifiable granule (EG), Emulsion water-in-oil (EO), Emulsifiable powder (EP), Emulsion for seed treatment (ES), Emulsion oil-in-water (EW), Flowable concentrate for seed treatment (FS), Granules (GR), Micro-emulsion (ME), Oil-dispersion (OD), Oil miscible flowable concentrate (OF), Oil miscible liquid (OL), Oil dispersible powder (OP), Suspension concentrate (SC), Suspension concentrate for direct application (SD), Suspo-emulsion (SE), Water soluble granule (SG), Soluble concentrate (SL), Spreading oil (SO), Water soluble powder (SP), Water soluble tablet (ST), Ultra-low volume (ULV) suspension, Tablet (TB), Ultra-low volume (ULV) liquid, Water dispersible granules (WG/WDG), Wettable powder (WP), Water dispersible powder for slurry seed treatment (WS), Water dispersible tablet (WT), a mixed formulation of CS and SC (ZC) or a mixed formulation of CS and SE (ZE), a mixed formulation of CS and EW (ZW). In a preferred embodiment, the composition is formulated as SC and SE.

In an aspect, the composition of the present invention comprises of excipients selected from the group comprising of dispersing agent, wetting agent, emulsifier, anti-freeze agent, defoamer, biocide, thickener and solvent or a combination thereof and other excipients as will be required in a particular type of formulation. In another aspect, the composition is formulated as SC and comprises of one or more excipient selected from dispersing agent, wetting agent, anti-freeze agent, defoamer, biocide, thickener and demineralized water (D.M. water). In another aspect, the composition is formulated as SE and comprises of one or more excipient selected from dispersing agent, wetting agent, emulsifier, anti-freeze agent, defoamer, biocide, solvent, and thickener.

It is generally observed that solid particles in a liquid undergo spontaneous aggregation to form lumps. Hence, it is recommended to add a dispersing agent which prevents agglomeration of solid particles and keep them suspended in fluid. Accordingly, the composition of the present invention contains dispersing agent such as amine salt of phosphate tristyryl phenol ethoxylated, acrylic copolymer, acrylic graft copolymer, salt of naphthalene sulphonate, naphthalene sulfonate formaldehyde condensate, phosphate ester, salt of polycarboxylate, alcohol block copolymer, ethoxylated polyarylphenol phosphate ester, tristyrylphenol ethoxylate phosphate ester. One or more dispersing agents may be used in the composition of the present invention. The dispersing agent is present in an amount in the range from 2 to 10% w/w.

Wetting is the first stage of dispersion, in which air surrounding the granular composition is substituted with water. Wetting of the composition with water cannot occur if the surface tension of the liquid is very high. Hence, it is recommended to add a wetting agent to the composition to facilitate the process of dispersion of the granules in the liquid. Non-limiting examples of wetting agents that can be used in the composition include ethoxylated polyarylphenol phosphate ester, dioctyl sulphosuccinate, non-ionic ethoxylate, alkylarylpolyglycol ether, castor oil ethoxylate. One or more wetting agents may be used in the composition of the present invention. The wetting agent is present in an amount in the range from 1 to 5% w/w.

An emulsifier is a kind of surfactant. It helps to prevent the droplets of the dispersed phase of an emulsion from flocculating or coalescing in the emulsion. It can be or include a cationic, zwitterionic or a non-ionic emulsifier. Suitable emulsifier used herein, but not limited to, polyethylene oxide block copolymer, high molecular weight polymer (polyvinyl alcohol), PEG-10 PPG-5 cetyl phosphate, ethylene oxide (EO)-polyethylene oxide (PO) block copolymer, tristyryl phenol, ethoxylated nonionic emulsifier, blend of non-ionic-anionic emulsifiers (proprietary blend), castor oil ethoxylated or a combination thereof. Preferably, emulsifier is present in an amount in the range from 2 to 7% w/w.

An anti-freeze agent is generally added to the composition, to prevent the aqueous compositions from freezing. Suitable anti-freeze agents used herein, but not limited to, glycerol, propylene glycol, diethylene glycol, monoethylene glycol or a combination thereof and present in an amount in the range from 1 to 10% w/w.

A defoamer is generally added to the composition, as foam formation prevents the efficient filling of a container. Suitable defoamer used herein, but not limited to, silicon emulsion, dimethyl polysiloxane emulsion, polysiloxane emulsion or a combination thereof and present in an amount in the range from 0.01 to 0.5% w/w.

A biocide is added to the composition of the present invention for its preservation against spoilage from bacteria, yeasts and fungi. Suitable biocide used herein, but not limited to, 20% aqueous dipropylene glycol solution of 1,2-benzisothiazolin-3-one, formaldehyde, isothiazolinone or a combination thereof, and present in an amount in the range from 0.01 to 0.50% w/w.

A thickener is added to the composition to reduce the tendency of the composition to disperse when sprayed, and decrease the likelihood of it being rinsed off from the crops. Suitable thickener used herein are water-soluble polymer and inorganic fine powder. The water-soluble polymer is selected from xanthan gum, welan gum, guar gum, polyvinyl alcohol, carboxymethylcellulose, polyvinylpyrrolidone, carboxyvinyl polymer, acrylic polymer, starch derivative or polysaccharide. The inorganic fine powder is selected from high purity silica, white carbon or a combination thereof. The thickener is present in an amount in the range from 0.01 to 0.5% w/w. Xanthan gum used in the present invention is obtained from a commercial source.

The solvent used in the present invention is selected from the group comprising of water; alcohols such as ethanol, propanol, butan-1-ol, n-octanol, isopropanol ethylene glycol, diethylene glycol, propylene glycol, polyethylene glycol, glycerine; polyol ethers such as ethylene glycol monopropyl ether, diethylene glycol monomethyl ether, dipropylene glycol dimethyl ether; ketones such as acetone, methyl ethyl ketone, methyl isobutyl ketone, cyclohexanone; ethers such as dipropyl ether, dioxane, tetrahydrofuran; aliphatic hydrocarbons such as normal paraffin, isoparaffin, kerosene, mineral oil; aromatic hydrocarbons such as xylene, toluene, solvent naphtha, solvent C9, solvent C10, solvent C12, solvesso 100, solvesso 150, solvesso 200; chlorinated aliphatic or aromatic hydrocarbons such as chlorobenzene, chloroethylene, methylene chloride; esters such as ethyl acetate, diisopropyl phthalate, dimethyl adipate, methyl oleate, methyl tallowate; lactones such as gamma-butyrolactone; amides such as dimethylformamide, N-methyl-2-pyrrolidone, N-octylpyrolidone, decanamide, N,N-dimethyldecanamide; nitriles such as acetonitrile; organosulfur compound such as dimethyl sulfoxide. The solvent may be used alone or in combination and is present in an amount 5 to 25% w/w.

The composition of the present invention can be applied by any one of the methods selected from atomization, spraying, irrigation (chemigation), sprinkling (water immersion), watering.

In an embodiment, the present invention provides a process for the preparation of the composition in SC form. The process comprises mixing water, biocide, defoamer, antifreeze agent, dispersing agent and wetting agent. To the same, Chlorantraniliprole, Spirotetramat and at least one compound selected from Buprofezin, Bifenthrin, Propargite or Pyriproxyfen are added and mixed to obtain a homogeneous slurry. The slurry is then wet grinded in a suitable mill till required particle size is obtained. To the grinded mass, water solution of thickener is added with low shear mixing to obtain the composition in SC form.

In another embodiment, the present invention provides a process for the preparation of a SE formulation. The process comprises: a) mixing of Chlorantraniliprole, Spirotetramat and at least one excipient to prepare a first composition in the form of SC, b) mixing at least one compound selected from Buprofezin, Bifenthrin, Propargite or Pyriproxyfen with a solvent, an emulsifier to obtain a second composition in the form of EW/EC, c) mixing of first composition, second composition and thickener results in a composition of the present invention in SE form.

The synergistic composition of the present invention is found to be effective to control wide spectrum of insect pests from the orders of Lepidoptera, Coleoptera, Diptera, Isoptera, Heteropetera, Homoptera, Acarina, Thysanoptera, and Orthoptera. The composition of the present invention may be used to control of variety of insect pests in cereals, paddy, pulses, oilseeds, horticulture crops, fibre crops, sugarcane and spice crops.

The rate of application amount varies depending on, for example, the blending ratio of active ingredients, meteorological condition, dosage form, application time, application method, application place, insect-pests to be controlled and target crop, in ordinary cases.

The synergetic composition of the present invention is more effective than their individual counterparts. This allows a substantial reduction in the application rates of each of these active ingredients, while maintaining good efficacy. The decrease in application rates reduces treatment cost to the farmer and also eases the burden on the environment both from manufacturing waste and crop protection chemical residues.

The synergistic insecticidal composition of present invention provides a wide spectrum control of insect-pests, delays the emergence of the resistant strains, minimizes the risk of development of resistance and achieves effective and economical control of undesired or insect-pest.

The synergistic composition of the present invention provides a number of other advantages:

- Increased efficacy in comparison to the other formulations tested during the trial.
- Economically beneficial to the farmers as it provides better yield of the crop with reduction in the number of sprays.
- Reduced possibility of hazards to the farmers due to occupational exposure because of reduction in the number of sprays.
- Is storage stable.
- Is non-phytotoxic.
- Reduction in environmental load of insecticidal residues.
- Reduction in quantity of water required for spray of the product in agriculture fields.
- Reduction in generation of empty containers of product, thereby, reducing concerns of their disposal.

Thus, from the foregoing description, it will be apparent to one of the person skilled in the art that many changes and modifications can be made thereto without departing from the scope of the invention as set forth in the description. Accordingly, it is not intended that the scope of the foregoing description be limited to the description set forth above, but rather that such description be construed as encompassing such features that reside in the present invention, including all the features and embodiments that would be treated as equivalents thereof by those skilled in the relevant art.

The embodiments of the present invention are more particularly described in the following examples that are intended as illustrations only, since numerous modifications and variations within the scope of the present invention will be apparent to those of skill in the art. Unless otherwise noted, all parts, percentages and ratios reported in the following examples are on a weight basis and all reagents used in the examples were obtained or are available from the chemical suppliers.

EXAMPLES

The synergistic insecticidal composition of the present invention comprising Chlorantraniliprole, Spirotetramat and at least one compound selected from Buprofezin, Bifenthrin, Propargite or Pyriproxyfen in the form of suspension concentrate (SC) is provided in table 1 and 2 and in the form of suspo-emulsion (SE) is provided in table 4 and 5.

The unit of each component of the composition are expressed in "% w/w" i.e. the percentage by weight, relative to the weight of the total solution or composition. The term "Q.S." denotes quantity sufficient required to make 100% w/w formulation.

TABLE 1

Composition of Chlorantraniliprole + Spirotetramat + Buprofezin SC

| S. No. | Ingredients | Eg 1 % By Weight | Eg 2 % By Weight | Eg 3 % By Weight | Eg 4 % By Weight | Eg 5 % By Weight |
|---|---|---|---|---|---|---|
| 1 | Chlorantraniliprole | 6.00 | 1.00 | 10.00 | 3.00 | 15.00 |
| 2 | Spirotetramat | 12.00 | 30.00 | 10.00 | 6.00 | 5.00 |
| 3 | Buprofezin | 10.00 | 20.00 | 30.00 | 20.00 | 5.00 |
| 4 | Anti-freezing agent (Propylene glycol) | 5.00 | 7.00 | 7.00 | 5.00 | 5.00 |
| 5 | Dispersing agent (Acrylic graft Copolymer) | 5.00 | 6.00 | 6.00 | 5.00 | 5.00 |
| 6 | Wetting agent (Non-ionic ethoxylate) | 3.00 | 3.00 | 3.00 | 3.00 | 3.00 |
| 7 | Defoamer (Dimethyl Polysiloxane emulsion) | 0.10 | 0.10 | 0.10 | 0.10 | 0.10 |
| 8 | Biocide (20% aqueous dipropylene glycol solution of 1,2-benzisothiazolin-3-one) | 0.10 | 0.10 | 0.10 | 0.10 | 0.10 |
| 9 | Thickener (Xanthan Gum) | 0.20 | 0.20 | 0.20 | 0.20 | 0.20 |
| 10 | D.M. Water | Q.S. to make 100 | Q.S. to make 100 | Q.S. to make 100 | Q.S. to make 100 | Q.S. to make 100 |
| | Total | 100.00 | 100.00 | 100.00 | 100.00 | 100.00 |

TABLE 2

Composition of Chlorantraniliprole + Spirotetramat + Bifenthrin SC

| S. No. | Ingredients | Eg 6 % By Weight | Eg 7 % By Weight | Eg 8 % By Weight | Eg 9 % By Weight | Eg 10 % By Weight |
|---|---|---|---|---|---|---|
| 1 | Chlorantraniliprole | 6.00 | 15.00 | 1.00 | 4.00 | 10.00 |
| 2 | Spirotetramat | 12.00 | 5.00 | 10.00 | 15.00 | 30.00 |
| 3 | Bifenthrin | 10.00 | 2.50 | 25.00 | 20.00 | 15.00 |
| 4 | Anti-freezing agent (Propylene glycol) | 5.00 | 5.00 | 7.00 | 7.00 | 7.00 |
| 5 | Dispersing (Acrylic Copolymer) | 5.00 | 5.00 | 6.00 | 6.00 | 8.00 |
| 6 | Wetting agent (Non-ionic ethoxylate) | 3.00 | 3.00 | 3.00 | 3.00 | 5.00 |
| 7 | Defoamer (Dimethyl Polysiloxane emulsion) | 0.10 | 0.10 | 0.10 | 0.10 | 0.20 |
| 8 | Biocide (20% aqueous dipropylene glycol solution of 1,2-benzisothiazolin-3-one) | 0.10 | 0.10 | 0.10 | 0.10 | 0.15 |
| 9 | Thickener (Xanthan Gum) | 0.20 | 0.20 | 0.20 | 0.20 | 0.20 |
| 10 | D.M. Water | Q.S. to make 100 | Q.S. to make 100 | Q.S. to make 100 | Q.S. to make 100 | Q.S. to make 100 |
| | Total | 100.00 | 100.00 | 100.00 | 100.00 | 100.00 |

Process of Preparing Synergistic Insecticidal Composition of Present Invention in (SC) Form Table 3 mentions active ingredients in technical grade whereas entries for active ingredients in table 1 and 2 are for 100% pure compounds. Particularly, the examples 1, 4, and 6 corresponds to column A to C in table 3.

TABLE 3

Quantities of active ingredients and raw material charged

| S. No. | Ingredients | Function | Quantity(g) A | B | C |
|---|---|---|---|---|---|
| 1 | Chlorantraniliprole Technical (Basis of 97.0%) | Active ingredient | 6.19 | 3.10 | 6.19 |
| 2 | Spirotetramat Technical (Basis of 97.0%) | Active ingredient | 12.38 | 6.19 | 12.38 |
| 3 | Buprofezin Technical (Basis of 98.0%) | Active ingredient | 10.21 | 20.41 | — |
| 4 | Bifenthrin Technical (Basis of 98.0%) | Active ingredient | — | — | 10.21 |
| 5 | Propylene glycol | Anti-freeze agent | 05.00 | 05.00 | 05.00 |
| 6 | Acrylic graft polymer | Dispersing agent | 05.00 | 05.00 | 05.00 |
| 7 | Non-ionic ethoxylate | Wetting agent | 03.00 | 03.00 | 03.00 |
| 8 | Dimethyl polysiloxane emulsion | Defoamer | 00.10 | 00.10 | 00.10 |
| 9 | 20% aqueous dipropylene glycol solution of 1,2-benzisothiazolin-3-one | Biocide | 00.10 | 00.10 | 00.10 |
| 10 | Xanthan Gum | Thickener | 00.20 | 00.20 | 00.20 |
| 11 | Demineralized water | Solvent | 57.82 | 56.90 | 57.82 |
| | Total | | 100.00 | 100.00 | 100.00 |

The ingredients were weighed and taken as per Table 3. Demineralised water, 20% aqueous dipropylene glycol solution of 1,2-benzisothiazolin-3-one, dimethyl polysiloxane emulsion were taken. Then, propylene glycol, acrylic graft copolymer, Non-ionic ethoxylate were added and stirred well. To the mixture, Chlorantraniliprole, Spirotetramat and one of Buprofezin or Bifenthrin were added with stirring. The mixture was homogenized with high speed homogenizer to obtain homogeneous slurry. The slurry was wet grinded using a suitable bead mill/sand mill till required particle size was achieved. During wet grinding temperature was maintained between 25° C. to 30° C. After wet grinding, material was withdrawn through mill and water wash was given with remaining water and was withdrawn in the same container and mixed well. To the mixture, water solution of xanthan gum was added with low shear mixing stirrer to obtain the composition of present invention in SC form.

TABLE 4

Composition of Chlorantraniliprole + Spirotetramat + Propargite SE

| S. No. | Ingredients | Eg 11 % By Weight | Eg 12 % By Weight | Eg 13 % By Weight | Eg 14 % By Weight | Eg 15 % By Weight |
|---|---|---|---|---|---|---|
| 1 | Chlorantraniliprole | 6.00 | 1.00 | 10.00 | 8.00 | 15.00 |
| 2 | Spirotetramat | 12.00 | 30.00 | 15.00 | 20.00 | 5.00 |
| 3 | Propargite | 50.00 | 35.00 | 40.00 | 20.00 | 50.00 |
| 4 | Anti-freezing agent (Propylene glycol) | 5.00 | 5.00 | 3.00 | 5.00 | 3.00 |
| 5 | Dispersing agent (Acrylic Copolymer) | 3.00 | 3.00 | 2.00 | 3.00 | 2.00 |
| 6 | Co-Dispersant (Phosphate Ester) | 1.50 | 2.00 | 1.00 | 1.00 | 1.00 |
| 7 | Solvent (C9) | 8.00 | 8.00 | 8.00 | 6.00 | 8.00 |
| 8 | Emulsifier 1 (Blend of non-ionic and anionic) | 3.00 | 3.00 | 5.00 | 3.00 | 5.00 |
| 9 | Emulsifier 2 (Tristyryl Phenol) | 3.00 | 3.00 | 3.00 | 3.00 | 3.00 |
| 10 | Wetting agent (Non-ionic ethoxylate) | 2.00 | 2.00 | 2.00 | 2.00 | 1.50 |
| 11 | Defoamer (Silicone emulsion) | 0.15 | 0.15 | 0.15 | 0.15 | 0.15 |
| 12 | Biocide (20% aqueous dipropylene glycol solution of 1,2-benzisothiazolin-3-one) | 0.15 | 0.15 | 0.15 | 0.15 | 0.15 |
| 13 | Thickener (Xanthan Gum) | 0.10 | 0.10 | 0.10 | 0.20 | 0.10 |
| 14 | D.M. Water | Q.S. to make 100 | Q.S. to make 100 | Q.S. to make 100 | Q.S. to make 100 | Q.S. to make 100 |
| | Total | 100.00 | 100.00 | 100.00 | 100.00 | 100.00 |

TABLE 5

Composition of Chlorantraniliprole + Spirotetramat + Pyriproxyfen SE

| S. No. | Ingredients | Eg 16 % By Weight | Eg 17 % By Weight | Eg 18 % By Weight | Eg 19 % By Weight | Eg 20 % By Weight |
|---|---|---|---|---|---|---|
| 1 | Chlorantraniliprole | 6.00 | 15.00 | 1.00 | 5.00 | 10.00 |
| 2 | Spirotetramat | 12.00 | 5.00 | 30.00 | 20.00 | 15.00 |
| 3 | Pyriproxyfen | 10.00 | 20.00 | 5.00 | 10.00 | 12.00 |
| 4 | Anti-freezing agent (Propylene glycol) | 5.00 | 7.00 | 7.00 | 7.00 | 7.00 |
| 5 | Dispersing agent (Acrylic Copolymer) | 3.00 | 5.00 | 5.00 | 5.00 | 5.00 |
| 6 | Co-Dispersant (Phosphate Ester) | 1.50 | 2.00 | 2.00 | 2.00 | 2.00 |
| 7 | Solvent (C9) | 15.00 | 15.00 | 10.00 | 15.00 | 15.00 |
| 8 | Co-Solvent (Naptha) | 2.00 | 2.00 | 5.00 | 5.00 | 5.00 |
| 9 | Emulsifier (Tristyryl Phenol) | 4.00 | 5.00 | 3.00 | 4.00 | 4.00 |
| 10 | Wetting agent (Non-ionic ethoxylate) | 2.00 | 2.00 | 2.00 | 2.00 | 2.00 |
| 11 | Defoamer (Silicone emulsion) | 0.15 | 0.15 | 0.15 | 0.15 | 0.15 |
| 12 | Biocide (20% aqueous dipropylene glycol solution of 1,2-benzisothiazolin-3-one) | 0.15 | 0.15 | 0.15 | 0.15 | 0.15 |
| 13 | Thickener (Xanthan Gum) | 0.20 | 0.20 | 0.20 | 0.20 | 0.20 |
| 14 | D.M. Water | Q.S. to make 100 | Q.S. to make 100 | Q.S. to make 100 | Q.S. to make 100 | Q.S. to make 100 |
| | Total | 100.00 | 100.00 | 100.00 | 100.00 | 100.00 |

Process of Preparing Synergistic Insecticidal Composition of Present Invention in SE Form Table 6 mentions active ingredients in technical grade whereas entries for active ingredients in table 4 and 5 are for 100% pure compounds. Particularly, examples 11 and 16 corresponds to column D and E in table 6.

TABLE 6

Quantities of active ingredients and raw material charged

| S. No. | Ingredients | Function | Quantity (g) D | Quantity (g) E |
|---|---|---|---|---|
| 1 | Chlorantraniliprole Technical (97% Basis) | Active ingredient | 06.19 | 6.19 |
| 2 | Spirotetramat Technical (97% Basis) | Active ingredient | 12.38 | 12.38 |
| 3 | Propargite Technical (92% Basis) | Active ingredient | 54.35 | — |
| 4 | Pyriproxyfen Technical (95% Basis) | Active ingredient | — | 10.53 |
| 5 | Acrylic copolymer | Dispersing agent | 03.00 | 3.00 |
| 6 | Phosphate ester | Co-dispersing agent | 1.50 | 1.50 |
| 7 | N-methyl-2-pyrrolidone | Solvent | 8.00 | 15.00 |
| 8 | Naptha | Co-solvent | — | 02.00 |
| 9 | Blend of non-ionic and anionic emulsifier | Emulsifier 1 | 3.00 | — |
| 10 | Tristyryl phenol | Emulsifier 2 | 3.00 | 4.00 |
| 11 | Non-ionic ethoxylate | Wetting agent | 2.00 | 2.00 |
| 12 | Propylene glycol | Anti-freeze agent | 5.00 | 5.00 |
| 13 | Silicon emulsion | Defoamer | 0.15 | 0.15 |
| 14 | (20% aqueous dipropylene glycol solution of 1,2-benzisothiazolin-3-one) | Biocide | 0.15 | 0.15 |
| 15 | Xanthan Gum | Thickener | 0.10 | 0.20 |
| 16 | Demineralized water | Solvent | 1.18 | 37.90 |
| Total | | | 100.00 | 100.00 |

All the ingredients were taken as per table 6. 20% aqueous dipropylene glycol solution of 1,2-benzisothiazolin-3-one, Silicon emulsion were diluted in demineralised water. Then propylene glycol, acrylic copolymer, phosphate ester non-ionic ethoxylate were added and stirred well. Then, Chlorantraniliprole, Spirotetramat were added for SC preparation with stirring and homogenized with high speed homogenizer having suitable RPM to obtain a homogeneous slurry. The homogeneous slurry was wet grinded in a suitable bead mill till required particle size was obtained. During wet grinding temperature was maintained between 25° C. to 30° C. After wet grinding, material was withdrawn through mill and water wash was given with remaining water and was withdrawn in the same container and mixed well. In another vessel, Propargite/Pyriproxyfen was dissolved in N-methyl-2-pyrrolidone and naptha. Then tristyryl phenol was added and mixed in a high shear mixer and demineralized water was added to obtain EW/EC formulation. To the EW/EC preparation, the above SC preparation was added and mixed well to obtain homogeneous mixture. To the mixture, water solution of xanthan gum was added and stirred with low shear mixing stirrer to obtain the composition of present invention in SE form.

Bio-Efficacy Studies

Field experiment was conducted to evaluate the efficacy of the composition of the present invention. In experiment A, efficacy of combination of Chlorantraniliprole+Spirotetramat+Buprofezin/Bifenthrin/Propargite/Pyriproxyfen on the control of Thrips, Mites and Fruit Borer in Chilli crop (variety: Dabbi Byadgi) was evaluated.

A field experiment was conducted on Chilli crop (variety: Dabbi Byadgi) to evaluate the control of Thrips, Mites and Fruit Borer with solo formulations, binary combinations and ternary composition of the present invention as per the details provided in Table 7 to 21.

The population of Thrips/Mites is recorded on a suitable no. of randomly selected leaf per replication. Suitable no. of randomly selected leaves per plant are selected for observations. Observations were made at 5, 10, 15 and 30 days after application (DAA).

The experiment was laid out in Randomized Block Design (RBD). The plot size was 10 m×10 m and the spacing was 60 cm×45 cm. All the recommended agronomic practices were followed throughout the cropping period. Applications were made with a domestic sprayer fitted with a pressure regulator and hollow cone nozzle. One single application was made using hollow cone nozzle using spray fluid 500 l/ha at an interval of 50 days after transplanting. The various treatments were sprayed on Chilli crop to evaluate the control of Thrips, Mites and Fruit Borer. All treatments were replicated thrice. Based on various doses, weighed quantity of test products were dissolved in 5 litres of water/treatment and sprayed uniformly.

The % reduction in target insect population over control was calculated using Abbott's formula as below:

$$\text{Corrected \% Insect Reduction} = 1 - \left[\frac{n \text{ in } T \text{ after treatment}}{n \text{ in } Co \text{ after treatment}}\right] \times 100$$

Where, $n = no.$ of insects; $T$ = Treated; $Co$ = Control

[Reference: Abbott, W. S. (1925). *A method of computing the effectiveness of an insecticide. J. Econ. Entomol.*; 18:265-267.]

The no. of damaged fruit is recorded on each pickings from total fruits.

% ball damage reduction over control was calculated using Abbott's formula as below:

$$\text{Corrected \% Fruit Damage Reduction} = 1 - \left[\frac{n \text{ in } T \text{ after treatment}}{n \text{ in } Co \text{ after treatment}}\right] \times 100$$

Where, $n = no.$ of damaged fruits; $T$ = Treated; $Co$ = Control

[Reference: Abbott, W. S. (1925). *A method of computing the effectiveness of an insecticide. J. Econ. Entomol.;* 18:265-267]

The Total marketable Fruit yield for all pickings was recorded for each plot and converted into quintal per hectare (q/ha).

The observations on phytotoxicity effect of test insecticide were recorded during crop period.

TABLE 7

Efficacy of combination of Chlorantraniliprole 6% + Spirotetramat 12% + Buprofezin 10% SC on Thrips

| S No. | Treatment | Dose Formulation (ml/ha) | Dose a.i./ha (g) | Thrips (per three leaf) 5 DAA | 10 DAA | 15 DAA | 30 DAA | Mean | % reduction against control |
|---|---|---|---|---|---|---|---|---|---|
| 1 | Chlorantraniliprole 6% + Spirotetramat 12% + Buprofezin 10% SC | 500 ml | 30 + 60 + 50 | 4.33 (2.20) | 3.67 (2.04) | 4.33 (2.20) | 6.67 (2.68) | 4.75 (2.29) | 84.12 |
| 2 | Chlorantraniliprole 18.5% SC + Spirotetramat 15.31% OD | 150 + 400 | 30 + 60 | 8.33 (2.97) | 9.33 (3.14) | 11.00 (3.39) | 14.67 (3.89) | 10.83 (3.37) | 63.79 |
| 3 | Spirotetramat 15.31% OD + Buprofezin 25% SC | 400 + 200 | 60 + 50 | 7.33 (2.80) | 8.00 (2.92) | 9.67 (3.19) | 12.00 (3.54) | 9.25 (3.12) | 69.08 |
| 4 | Chlorantraniliprole 18.5% SC + Buprofezin 25% SC | 150 + 200 | 30 + 50 | 10.33 (3.29) | 14.00 (3.81) | 18.33 (4.34) | 23.00 (4.85) | 16.42 (4.11) | 45.13 |
| 5 | Chlorantraniliprole 18.5% SC | 150 | 30 | 16.00 (4.06) | 19.67 (4.49) | 25.33 (5.08) | 37.67 (6.18) | 24.67 (5.02) | 17.55 |
| 6 | Spirotetramat 15.31% OD | 400 | 60 | 9.00 (3.08) | 9.67 (3.19) | 12.00 (3.54) | 15.67 (4.02) | 11.59 (3.48) | 61.28 |
| 7 | Buprofezin 25%SC | 200 | 50 | 12.33 (3.58) | 16.00 (4.06) | 17.67 (4.26) | 22.67 (4.81) | 17.17 (4.20) | 42.62 |
| 8 | Control | — | — | 19.33 (4.45) | 24.00 (4.95) | 30.67 (5.58) | 45.67 (6.79) | 29.92 (5.52) | — |
| | SE(m)± | — | — | 0.372 | 0.510 | 0.663 | 1.015 | 0.637 | — |
| | C.D. 5% | — | — | 1.139 | 1.562 | 2.031 | 3.108 | 1.952 | — |

Figure in parenthesis represents square root transformed value;
SEm±: Standard errors of means;
CD@5%: Critical Difference

TABLE 8

Efficacy of combination of Chlorantraniliprole 6% + Spirotetramat 12% + Buprofezin 10% SC on Mites

| S. No. | Treatment | Dose Formulation (ml/ha) | Dose a.i./ha (g) | Mites (per three leaf) 5 DAA | 10 DAA | 15 DAA | 30 DAA | Mean | % reduction against control |
|---|---|---|---|---|---|---|---|---|---|
| 1 | Chlorantraniliprole 6% + Spirotetramat 12% + Buprofezin 10% SC | 500 ml | 30 + 60 + 50 | 2.33 (1.68) | 2.00 (1.58) | 2.67 (1.78) | 3.67 (2.04) | 2.67 (1.78) | 80.60 |

TABLE 8-continued

Efficacy of combination of Chlorantraniliprole 6% + Spirotetramat 12% + Buprofezin 10% SC on Mites

| S. No. | Treatment | Dose Formulation (ml/ha) | Dose a.i./ha (g) | Mites (per three leaf) 5 DAA | 10 DAA | 15 DAA | 30 DAA | Mean | % reduction against control |
|---|---|---|---|---|---|---|---|---|---|
| 2 | Chlorantraniliprole 18.5% SC + Spirotetramat 15.31% OD | 150 + 400 | 30 + 60 | 5.00 (2.35) | 5.33 (2.41) | 6.67 (2.68) | 8.33 (2.97) | 6.33 (2.61) | 53.95 |
| 3 | Spirotetramat 15.31% OD + Buprofezin 25% SC | 400 + 200 | 60 + 50 | 4.67 (2.27) | 4.33 (2.20) | 5.67 (2.48) | 7.00 (2.74) | 5.42 (2.43) | 60.60 |
| 4 | Chlorantraniliprole 18.5% SC + Buprofezin 25% SC | 150 + 200 | 30 + 50 | 6.67 (2.68) | 7.33 (2.80) | 9.67 (3.19) | 12.00 (3.54) | 8.92 (3.07) | 35.15 |
| 5 | Spirotetramat 15.31% OD | 400 | 60 | 5.33 (2.41) | 5.00 (2.35) | 6.33 (2.61) | 7.67 (2.86) | 6.08 (2.57) | 55.76 |
| 6 | Chlorantraniliprole 18.5% SC | 150 | 30 | 7.67 (2.86) | 10.00 (3.24) | 12.33 (3.58) | 16.67 (4.14) | 11.67 (3.49) | 15.15 |
| 7 | Buprofezin 25% SC | 200 | 50 | 7.00 (2.74) | 8.00 (2.92) | 10.33 (3.29) | 13.67 (3.76) | 9.75 (3.20) | 29.09 |
| 8 | Control | — | — | 8.67 (3.03) | 11.33 (3.44) | 14.33 (3.85) | 20.67 (4.60) | 13.75 (3.77) | — |
| | SE(m)± | — | — | 0.153 | 0.236 | 0.294 | 0.430 | 0.277 | — |
| | C.D. 5% | — | — | 0.468 | 0.723 | 0.899 | 1.315 | 0.849 | — |

Figure in parenthesis represents square root transformed value;
SEm±: Standard errors of means;
CD@5%: Critical Difference

TABLE 9

Efficacy of combination of Chlorantraniliprole 6% + Spirotetramat 12% + Buprofezin 10% SC on fruit borer damage and marketable fruit yield

| S. No. | Treatment | Dose Formulation (ml/ha) | Dose a.i./ha (g) | % Damage (Chilli Fruit Borer) $1^{st}$ Picking | $2^{nd}$ Picking | $3^{rd}$ Picking | $4^{th}$ Picking | Mean | % reduction against control | Marketable Fruit Yield (q/ha) |
|---|---|---|---|---|---|---|---|---|---|---|
| 1 | Chlorantraniliprole 6% + Spirotetramat 12% + Buprofezin 10% SC | 500 ml | 30 + 60 + 50 | 2.98 (9.94) | 3.36 (10.56) | 3.65 (11.01) | 4.13 (11.73) | 3.53 (10.83) | 88.11 | 30.24 |
| 2 | Chlorantraniliprole 18.5% SC + Spirotetramat 15.31% OD | 150 + 400 | 30 + 60 | 8.37 (16.82) | 8.65 (17.10) | 10.88 (19.26) | 12.96 (21.10) | 10.22 (18.64) | 65.59 | 25.81 |
| 3 | Spirotetramat 15.31% OD + Buprofezin 25% SC | 400 + 200 | 60 + 50 | 15.77 (23.40) | 17.55 (24.77) | 18.57 (25.53) | 20.25 (26.74) | 18.04 (25.13) | 39.25 | 24.19 |
| 4 | Chlorantraniliprole 18.5% SC + Buprofezin 25% SC | 150 + 200 | 30 + 50 | 8.46 (16.91) | 9.11 (17.57) | 11.75 (20.05) | 13.39 (21.46) | 10.68 (19.07) | 64.03 | 24.38 |
| 5 | Chlorantraniliprole 18.5% SC | 150 | 30 | 10.37 (18.79) | 10.85 (19.23) | 11.86 (20.14) | 12.48 (20.69) | 11.39 (19.72) | 61.63 | 23.88 |
| 6 | Spirotetramat 15.31% OD | 400 | 60 | 17.96 (25.07) | 19.61 (26.28) | 21.02 (27.29) | 24.58 (29.72) | 20.79 (27.13) | 29.96 | 23.42 |
| 7 | Buprofezin 25% SC | 200 | 50 | 18.30 (25.33) | 22.13 (28.06) | 25.45 (30.30) | 28.77 (32.44) | 23.66 (29.11) | 20.29 | 22.03 |
| 8 | Control | — | — | 23.52 (29.01) | 28.70 (32.39) | 31.20 (33.96) | 35.33 (36.47) | 29.69 (33.02) | — | 17.26 |
| | SE(m)± | — | — | 0.516 | 0.641 | 0.684 | 0.779 | 0.653 | — | 0.277 |
| | C.D. 5% | — | — | 1.580 | 1.963 | 2.093 | 2.384 | 2.000 | — | 0.848 |

Figure in parenthesis represents arc sin transformed value;
SEm±: Standard errors of means;
CD@5%: Critical Difference

TABLE 10

Efficacy of combination of Chlorantraniliprole 3% + Spirotetramat 6% + Buprofezin 20% SC on Thrips

| S. No. | Treatment | Dose Formulation (ml/ha) | Dose a.i./ha (g) | Thrips (per three leaf) 5 DAA | 10 DAA | 15 DAA | 30 DAA | Mean | % reduction against control |
|---|---|---|---|---|---|---|---|---|---|
| 1 | Chlorantraniliprole 3% + Spirotetramat 6% + Buprofezin 20% SC | 1000 ml | 30 + 60 + 100 | 3.00 (1.87) | 2.67 (1.78) | 3.33 (1.96) | 4.67 (2.27) | 3.42 (1.98) | 88.58 |
| 2 | Chlorantraniliprole 18.5% SC + Spirotetramat 15.31% OD | 150 + 400 | 30 + 60 | 8.33 (2.97) | 9.33 (3.14) | 11.00 (3.39) | 14.67 (3.89) | 10.83 (3.37) | 63.79 |
| 3 | Spirotetramat 15.31% OD + Buprofezin 25% SC | 400 + 400 | 60 + 100 | 6.67 (2.68) | 7.00 (2.74) | 8.33 (2.97) | 10.67 (3.34) | 8.17 (2.94) | 72.70 |
| 4 | Chlorantraniliprole 18.5% SC + Buprofezin 25% SC | 150 + 400 | 30 + 100 | 9.33 (3.14) | 11.67 (3.49) | 16.00 (4.06) | 20.67 (4.60) | 14.42 (3.86) | 51.81 |
| 5 | Spirotetramat 15.31% OD | 400 | 60 | 9.00 (3.08) | 9.67 (3.19) | 12.00 (3.54) | 15.67 (4.02) | 11.59 (3.48) | 61.28 |
| 6 | Chlorantraniliprole 18.5% SC | 150 | 30 | 16.00 (4.06) | 19.67 (4.49) | 25.33 (5.08) | 37.67 (6.18) | 24.67 (5.02) | 17.55 |
| 7 | Buprofezin 25% SC | 400 | 100 | 9.67 (3.19) | 13.00 (3.67) | 16.33 (4.10) | 21.67 (4.71) | 15.17 (3.96) | 49.30 |
| 8 | Control | — | — | 19.33 (4.45) | 24.00 (4.95) | 30.67 (5.58) | 45.67 (6.79) | 29.92 (5.52) | — |
| | SE(m)± | — | — | 0.395 | 0.523 | 0.683 | 1.052 | 0.662 | — |
| | C.D. 5% | — | — | 1.210 | 1.602 | 2.092 | 3.221 | 2.028 | — |

Figure in parenthesis represents square root transformed value;
SEm±: Standard errors of means;
CD@5%: Critical Difference

TABLE 11

Efficacy of combination of Chlorantraniliprole 3% + Spirotetramat 6% + Buprofezin 20% SC on Mites

| S. No. | Treatment | Dose Formulation (ml/ha) | Dose a.i./ha (g) | Mites (per leaf) 5 DAA | 10 DAA | 15 DAA | 30 DAA | Mean | % reduction against control |
|---|---|---|---|---|---|---|---|---|---|
| 1 | Chlorantraniliprole 3% + Spirotetramat 6% + Buprofezin 20% SC | 1000 ml | 30 + 60 + 100 | 1.67 (1.47) | 1.33 (1.35) | 2.00 (1.58) | 2.33 (1.68) | 1.83 (1.53) | 86.67 |
| 2 | Chlorantraniliprole 18.5% SC + Spirotetramat 15.31% OD | 150 + 400 | 30 + 60 | 5.00 (2.35) | 5.33 (2.41) | 6.67 (2.68) | 8.33 (2.97) | 6.33 (2.61) | 53.95 |
| 3 | Spirotetramat 15.31% OD + Buprofezin 25% SC | 400 + 400 | 60 + 100 | 3.67 (2.04) | 3.33 (1.96) | 4.33 (2.20) | 5.33 (2.41) | 4.17 (2.16) | 69.71 |
| 4 | Chlorantraniliprole 18.5% SC + Buprofezin 25% SC | 150 + 400 | 30 + 100 | 6.00 (2.55) | 6.00 (2.55) | 8.33 (2.97) | 9.67 (3.19) | 7.50 (2.83) | 45.45 |
| 5 | Spirotetramat 15.31% OD | 400 | 60 | 5.33 (2.41) | 5.00 (2.35) | 6.33 (2.61) | 7.67 (2.86) | 6.08 (2.57) | 55.76 |
| 6 | Chlorantraniliprole 18.5% SC | 150 | 30 | 7.67 (2.86) | 10.00 (3.24) | 12.33 (3.58) | 16.67 (4.14) | 11.67 (3.49) | 15.15 |
| 7 | Buprofezin 25% SC | 400 | 100 | 6.00 (2.55) | 6.67 (2.68) | 9.00 (3.08) | 12.00 (3.54) | 8.42 (2.99) | 38.78 |
| 8 | Control | — | — | 8.67 (3.03) | 11.33 (3.44) | 14.33 (3.85) | 20.67 (4.60) | 13.75 (3.77) | — |
| | SE(m)± | — | — | 0.167 | 0.250 | 0.308 | 0.457 | 0.295 | — |
| | C.D. 5% | — | — | 0.512 | 0.766 | 0.943 | 1.399 | 0.902 | — |

Figure in parenthesis represents square root transformed value;
SEm±: Standard errors of means;
CD@5%: Critical Difference

TABLE 12

Efficacy of combination of Chlorantraniliprole 3% + Spirotetramat 6% + Buprofezin 20% SC on fruit borer damage and marketable fruit yield

| S. No. | Treatment | Dose Formulation (ml/ha) | Dose a.i./ha (g) | % Damage (Chilli Fruit Borer) 1st Picking | 2nd Picking | 3rd Picking | 4th Picking | Mean | % reduction against control | Marketable Fruit Yield (q/ha) |
|---|---|---|---|---|---|---|---|---|---|---|
| 1 | Chlorantraniliprole 3% + Spirotetramat 6% + Buprofezin 20% SC | 1000 ml | 30 + 60 + 100 | 2.59 (9.26) | 2.92 (9.84) | 3.18 (10.27) | 3.59 (10.92) | 3.07 (10.09) | 89.66 | 31.88 |
| 2 | Chlorantraniliprole 18.5% SC + Spirotetramat 15.31% OD | 150 + 400 | 30 + 60 | 8.37 (16.82) | 8.65 (17.10) | 10.88 (19.26) | 12.96 (21.10) | 10.22 (18.64) | 65.59 | 25.81 |
| 3 | Spirotetramat 15.31% OD + Buprofezin 25% SC | 400 + 400 | 60 + 100 | 14.35 (22.26) | 15.97 (23.55) | 16.90 (24.27) | 18.43 (25.42) | 16.41 (23.90) | 44.72 | 24.96 |
| 4 | Chlorantraniliprole 18.5% SC + Buprofezin 25% SC | 150 + 400 | 30 + 100 | 7.95 (16.38) | 8.56 (17.01) | 11.05 (19.42) | 12.59 (20.78) | 10.04 (18.47) | 66.19 | 25.18 |
| 5 | Spirotetramat 15.31% OD | 400 | 60 | 17.96 (25.07) | 19.61 (26.28) | 21.02 (27.29) | 24.58 (29.72) | 20.79 (27.13) | 29.96 | 23.42 |
| 6 | Chlorantraniliprole 18.5% SC | 150 | 30 | 10.37 (18.79) | 10.85 (19.23) | 11.86 (20.14) | 12.48 (20.69) | 11.39 (19.72) | 61.63 | 23.88 |
| 7 | Buprofezin 25% SC | 400 | 100 | 16.29 (23.80) | 19.70 (26.35) | 22.65 (28.42) | 25.61 (30.40) | 21.06 (27.32) | 29.05 | 22.89 |
| 8 | Control | — | — | 23.52 (29.01) | 28.70 (32.39) | 31.20 (33.96) | 35.33 (36.47) | 29.69 (33.02) | — | 17.26 |
| | SE(m)± | — | — | 0.507 | 0.628 | 0.666 | 0.760 | 0.639 | — | 0.307 |
| | C.D. 5% | — | — | 1.553 | 1.922 | 2.041 | 2.329 | 1.956 | — | 0.940 |

Figure in parenthesis represents arc sin transformed value;
SEm±: Standard errors of means;
CD@5%: Critical Difference

TABLE 13

Efficacy of combination of Chlorantraniliprole 6% + Spirotetramat 12% + Bifenthrin 10% SC on Thrips

| S. No. | Treatment | Dose Formulation (ml/ha) | Dose a.i./ha (g) | Thrips (per three leaf) 5 DAA | 10 DAA | 15 DAA | 30 DAA | Mean | % reduction against control |
|---|---|---|---|---|---|---|---|---|---|
| 1 | Chlorantraniliprole 6% + Spirotetramat 12% + Bifenthrin 10% SC | 500 ml | 30 + 60 + 50 | 4.67 (2.27) | 4.33 (2.20) | 5.00 (2.35) | 7.33 (2.80) | 5.33 (2.41) | 82.18 |
| 2 | Chlorantraniliprole 18.5% SC + Spirotetramat 15.31% OD | 150 + 400 | 30 + 60 | 8.33 (2.97) | 9.33 (3.14) | 11.00 (3.39) | 14.67 (3.89) | 10.83 (3.37) | 63.79 |
| 3 | Spirotetramat 15.31% OD + Bifenthrin 10% EC | 400 + 500 | 60 + 50 | 8.00 (2.92) | 8.67 (3.03) | 10.67 (3.34) | 13.33 (3.72) | 10.17 (3.27) | 66.01 |
| 4 | Chlorantraniliprole 18.5% SC + Bifenthrin 10% EC | 150 + 500 | 30 + 50 | 13.00 (3.67) | 15.67 (4.02) | 20.67 (4.60) | 26.00 (5.15) | 18.84 (4.40) | 37.04 |
| 5 | Spirotetramat 15.31% OD | 400 | 60 | 9.00 (3.08) | 9.67 (3.19) | 12.00 (3.54) | 15.67 (4.02) | 11.59 (3.48) | 61.28 |
| 6 | Chlorantraniliprole 18.5% SC | 150 | 30 | 16.00 (4.06) | 19.67 (4.49) | 25.33 (5.08) | 37.67 (6.18) | 24.67 (5.02) | 17.55 |
| 7 | Bifenthrin 10% EC | 500 | 50 | 15.33 (3.98) | 19.00 (4.42) | 23.67 (4.92) | 32.33 (5.73) | 22.58 (4.80) | 24.52 |
| 8 | Control | — | — | 19.33 (4.45) | 24.00 (4.95) | 30.67 (5.58) | 45.67 (6.79) | 29.92 (5.52) | — |
| | SE(m)± | — | — | 0.380 | 0.518 | 0.682 | 1.032 | 0.652 | — |
| | C.D. 5% | — | — | 1.164 | 1.587 | 2.089 | 3.161 | 1.997 | — |

Figure in parenthesis represents square root transformed value;
SEm±: Standard errors of means;
CD@5%: Critical Difference

TABLE 14

| Efficacy of combination of Chlorantraniliprole 6% + Spirotetramat 12% + Bifenthrin 10% SC on Mites | | | | | | | | | |
|---|---|---|---|---|---|---|---|---|---|
| | | Dose | Dose | Mites (per leaf) | | | | | % |
| S. No. | Treatment | Formulation (ml/ha) | a.i./ha (g) | 5 DAA | 10 DAA | 15 DAA | 30 DAA | Mean | reduction against |
| 1 | Chlorantraniliprole 6% + Spirotetramat 12% + Bifenthrin 10% SC | 500 ml | 30 + 60 + 50 | 1.00 (1.22) | 1.00 (1.22) | 1.33 (1.35) | 1.67 (1.47) | 1.25 (1.32) | 90.91 |
| 2 | Chlorantraniliprole 18.5% SC + Spirotetramat 15.31% OD | 150 + 400 | 30 + 60 | 5.00 (2.35) | 5.33 (2.41) | 6.67 (2.68) | 8.33 (2.97) | 6.33 (2.61) | 53.95 |
| 3 | Spirotetramat 15.31% OD + Bifenthrin 10% EC | 400 + 500 | 60 + 50 | 3.33 (1.96) | 3.00 (1.87) | 3.67 (2.04) | 4.67 (2.27) | 3.67 (2.04) | 73.33 |
| 4 | Chlorantraniliprole 18.5% SC + Bifenthrin 10% EC | 150 + 500 | 30 + 50 | 4.33 (2.20) | 4.67 (2.27) | 5.67 (2.48) | 7.33 (2.80) | 5.50 (2.45) | 60.00 |
| 5 | Spirotetramat 15.31% OD | 400 | 60 | 5.33 (2.41) | 5.00 (2.35) | 6.33 (2.61) | 7.67 (2.86) | 6.08 (2.57) | 55.76 |
| 6 | Chlorantraniliprole 18.5% SC | 150 | 30 | 7.67 (2.86) | 10.00 (3.24) | 12.33 (3.58) | 16.67 (4.14) | 11.67 (3.49) | 15.15 |
| 7 | Bifenthrin 10% EC | 500 | 50 | 4.33 (2.20) | 5.00 (2.35) | 5.67 (2.48) | 7.33 (2.80) | 5.58 (2.47) | 59.40 |
| 8 | Control | — | — | 8.67 (3.03) | 11.33 (3.44) | 14.33 (3.85) | 20.67 (4.60) | 13.75 (3.77) | — |
| | SE(m)± | — | — | 0.184 | 0.261 | 0.328 | 0.457 | 0.295 | — |
| | C.D. 5% | — | — | 0.562 | 0.799 | 1.006 | 1.399 | 0.902 | — |

Figure in parenthesis represents square root transformed value;
SEm±: Standard errors of means;
CD@5%: Critical Difference

TABLE 15

| Efficacy of combination of Chlorantraniliprole 6% + Spirotetramat 12% + Bifenthrin 10% SC on fruit borer damage and marketable fruit yield | | | | | | | | | | |
|---|---|---|---|---|---|---|---|---|---|---|
| | | Dose | Dose | % Damage (Chilli Fruit Borer) | | | | | % reduction | Marketable Fruit |
| S. No. | Treatment | Formulation (ml/ha) | a.i./ha (g) | 1st Picking | 2nd Picking | 3rd Picking | 4th Picking | Mean | against control | Yield (q/ha) |
| 1 | Chlorantraniliprole 6% + Spirotetramat 12% + Bifenthrin 10% SC | 500 ml | 30 + 60 + 50 | 2.44 (8.99) | 2.76 (9.56) | 2.99 (9.96) | 3.39 (10.61) | 2.90 (9.80) | 90.25 | 31.52 |
| 2 | Chlorantraniliprole 18.5% SC + Spirotetramat 15.31% OD | 150 + 400 | 30 + 60 | 8.37 (16.82) | 8.65 (17.10) | 10.88 (19.26) | 12.96 (21.10) | 10.22 (18.64) | 65.59 | 25.81 |
| 3 | Spirotetramat 15.31% OD + Bifenthrin 10% EC | 400 + 500 | 60 + 50 | 12.62 (20.81) | 14.04 (22.01) | 14.86 (22.67) | 16.20 (23.73) | 14.43 (22.33) | 51.39 | 24.93 |
| 4 | Chlorantraniliprole 18.5% SC + Bifenthrin 10% EC | 150 + 500 | 30 + 50 | 7.11 (15.46) | 7.65 (16.06) | 9.87 (18.31) | 11.25 (19.60) | 8.97 (17.43) | 69.79 | 25.20 |
| 5 | Spirotetramat 15.31% OD | 400 | 60 | 17.96 (25.07) | 19.61 (26.28) | 21.02 (27.29) | 24.58 (29.72) | 20.79 (27.13) | 29.96 | 23.42 |
| 6 | Chlorantraniliprole 18.5% SC | 150 | 30 | 10.37 (18.79) | 10.85 (19.23) | 11.86 (20.14) | 12.48 (20.69) | 11.39 (19.72) | 61.63 | 23.88 |
| 7 | Bifenthrin 10% EC | 500 | 50 | 12.44 (20.65) | 15.13 (22.89) | 17.33 (24.60) | 19.58 (26.26) | 16.12 (23.67) | 45.70 | 23.02 |
| 8 | Control | — | — | 23.52 (29.01) | 28.70 (32.39) | 31.20 (33.96) | 35.33 (36.47) | 29.69 (33.02) | — | 17.26 |
| | SE(m)± | — | — | 0.499 | 0.613 | 0.646 | 0.739 | 0.623 | — | 0.300 |
| | C.D. 5% | — | — | 1.530 | 1.876 | 1.979 | 2.264 | 1.907 | — | 0.918 |

Figure in parenthesis represents arc sin transformed value;
SEm±: Standard errors of means;
CD@5%: Critical Difference

TABLE 16

Efficacy of combination of Chlorantraniliprole 6% + Spirotetramat 12% + Propargite 50% SE on Thrips

| S. No. | Treatment | Dose Formulation (ml/ha) | Dose a.i./ha (g) | Thrips (per three leaf) 5 DAA | 10 DAA | 15 DAA | 30 DAA | Mean | % reduction against |
|---|---|---|---|---|---|---|---|---|---|
| 1 | Chlorantraniliprole 6% + Spirotetramat 12% + Propargite 50% SE | 500 ml | 30 + 60 + 250 | 6.00 (2.55) | 6.33 (2.61) | 7.00 (2.74) | 8.67 (3.03) | 7.00 (2.74) | 76.60 |
| 2 | Chlorantraniliprole 18.5% SC + Spirotetramat 15.31% OD | 150 + 400 | 30 + 60 | 8.33 (2.97) | 9.33 (3.14) | 11.00 (3.39) | 14.67 (3.89) | 10.83 (3.37) | 63.79 |
| 3 | Spirotetramat 15.31% OD + Propargite 57% EC | 400 + 441.2 | 60 + 250 | 9.00 (3.08) | 10.00 (3.24) | 11.67 (3.49) | 15.67 (4.02) | 11.59 (3.48) | 61.28 |
| 4 | Chlorantraniliprole 18.5% SC + Propargite 57% EC | 150 + 441.2 | 30 + 250 | 13.67 (3.76) | 18.33 (4.34) | 23.67 (4.92) | 34.33 (5.90) | 22.50 (4.80) | 24.79 |
| 5 | Spirotetramat 15.31% OD | 400 | 60 | 9.00 (3.08) | 9.67 (3.19) | 12.00 (3.54) | 15.67 (4.02) | 11.59 (3.48) | 61.28 |
| 6 | Chlorantraniliprole 18.5% SC | 150 | 30 | 16.00 (4.06) | 19.67 (4.49) | 25.33 (5.08) | 37.67 (6.18) | 24.67 (5.02) | 17.55 |
| 7 | Propargite 57% EC | 441.2 | 250 | 18.67 (4.38) | 22.00 (4.74) | 27.33 (5.28) | 39.67 (6.34) | 26.92 (5.24) | 10.03 |
| 8 | Control | — | — | 19.33 (4.45) | 24.00 (4.95) | 30.67 (5.58) | 45.67 (6.79) | 29.92 (5.52) | — |
| | SE(m)± | — | — | 0.390 | 0.519 | 0.693 | 1.088 | 0.672 | — |
| | C.D. 5% | — | — | 1.194 | 1.590 | 2.123 | 3.331 | 2.057 | — |

Figure in parenthesis represents square root transformed value;
SEm±: Standard errors of means;
CD@5%: Critical Difference

TABLE 17

Efficacy of combination of Chlorantraniliprole 6% + Spirotetramat 12% + Propargite 50% SE on Mites

| S. No. | Treatment | Dose Formulation (ml/ha) | Dose a.i./ha (g) | Mites (per leaf) 5 DAA | 10 DAA | 15 DAA | 30 DAA | Mean | % reduction against control |
|---|---|---|---|---|---|---|---|---|---|
| 1 | Chlorantraniliprole 6% + Spirotetramat 12% + Propargite 50% SE | 500 ml | 30 + 60 + 250 | 0.00 (0.71) | 0.00 (0.71) | 0.67 (1.08) | 1.00 (1.22) | 0.42 (0.96) | 96.96 |
| 2 | Chlorantraniliprole 18.5% SC + Spirotetramat 15.31% OD | 150 + 400 | 30 + 60 | 5.00 (2.35) | 5.33 (2.41) | 6.67 (2.68) | 8.33 (2.97) | 6.33 (2.61) | 53.95 |
| 3 | Spirotetramat 15.31% OD + Propargite 57% EC | 400 + 441.2 | 60 + 250 | 0.67 (1.08) | 1.00 (1.22) | 1.67 (1.47) | 2.33 (1.68) | 1.42 (1.39) | 89.69 |
| 4 | Chlorantraniliprole 18.5% SC + Propargite 57% EC | 150 + 441.2 | 30 + 250 | 1.33 (1.35) | 2.00 (1.58) | 2.67 (1.78) | 3.67 (2.04) | 2.42 (1.71) | 82.42 |
| 5 | Spirotetramat 15.31% OD | 400 | 60 | 5.33 (2.41) | 5.00 (2.35) | 6.33 (2.61) | 7.67 (2.86) | 6.08 (2.57) | 55.76 |
| 6 | Chlorantraniliprole 18.5% SC | 150 | 30 | 7.67 (2.86) | 10.00 (3.24) | 12.33 (3.58) | 16.67 (4.14) | 11.67 (3.49) | 15.15 |
| 7 | Propargite 57% EC | 441.2 | 250 | 1.67 (1.47) | 2.33 (1.68) | 2.67 (1.78) | 3.67 (2.04) | 2.59 (1.76) | 81.20 |
| 8 | Control | — | — | 8.67 (3.03) | 11.33 (3.44) | 14.33 (3.85) | 20.67 (4.60) | 13.75 (3.77) | — |
| | SE(m)± | — | — | 0.254 | 0.318 | 0.386 | 0.544 | 0.374 | — |
| | C.D. 5% | — | — | 0.778 | 0.973 | 1.184 | 1.665 | 1.146 | — |

Figure in parenthesis represents square root transformed value;
SEm±: Standard errors of means;
CD@5%: Critical Difference

TABLE 18

Efficacy of combination of Chlorantraniliprole 6% + Spirotetramat 12% + Propargite 50% SE on fruit borer damage and marketable fruit yield

| S. No. | Treatment | Dose Formulation (ml/ha) | Dose a.i./ha (g) | % Damage (Chilli Fruit Borer) 1st Picking | 2nd Picking | 3rd Picking | 4th Picking | Mean | % reduction against control | Marketable Fruit Yield (q/ha) |
|---|---|---|---|---|---|---|---|---|---|---|
| 1 | Chlorantraniliprole 6% + Spirotetramat 12% + Propargite 50% SE | 500 ml | 30 + 60 + 250 | 4.98 (12.89) | 5.61 (13.70) | 6.10 (14.30) | 6.90 (15.23) | 5.90 (14.06) | 80.13 | 29.3 |
| 2 | Chlorantraniliprole 18.5% SC + Spirotetramat 15.31% OD | 150 + 400 | 30 + 60 | 8.37 (16.82) | 8.65 (17.10) | 10.88 (19.26) | 12.96 (21.10) | 10.22 (18.64) | 65.59 | 25.81 |
| 3 | Spirotetram at 15.31% OD + Propargite 57% EC | 400 + 441.2 | 60 + 250 | 19.03 (25.86) | 21.18 (27.40) | 22.41 (28.25) | 24.44 (29.63) | 21.77 (27.81) | 26.69 | 22.89 |
| 4 | Chlorantraniliprole 18.5% SC + Propargite 57% EC | 150 + 441.2 | 30 + 250 | 10.84 (19.22) | 11.00 (19.37) | 14.18 (22.12) | 16.16 (23.70) | 13.05 (21.18) | 56.06 | 23.66 |
| 5 | Spirotetram at 15.31% OD | 400 | 60 | 17.96 (25.07) | 19.61 (26.28) | 21.02 (27.29) | 24.58 (29.72) | 20.79 (27.13) | 29.96 | 23.42 |
| 6 | Chlorantraniliprole 18.5% SC | 150 | 30 | 10.37 (18.79) | 10.85 (19.23) | 11.86 (20.14) | 12.48 (20.69) | 11.39 (19.72) | 61.63 | 23.88 |
| 7 | Propargite 57% EC | 441.2 | 250 | 22.78 (28.51) | 26.82 (31.19) | 28.99 (32.58) | 33.16 (35.16) | 27.94 (31.91) | 5.89 | 19.79 |
| 8 | Control | | | 23.52 (29.01) | 28.70 (32.39) | 31.20 (33.96) | 35.33 (36.47) | 29.69 (33.02) | — | 17.26 |
| | SE(m)± | — | — | 0.532 | 0.664 | 0.688 | 0.784 | 0.665 | — | 0.276 |
| | C.D. 5% | — | — | 1.630 | 2.032 | 2.106 | 2.401 | 2.038 | — | 0.844 |

Figure in parenthesis represents arc sin transformed value;
SEm±: Standard errors of means;
CD@5%: Critical Difference

TABLE 19

Efficacy of combination of Chlorantraniliprole 6% + Spirotetramat 12% + Pyriproxyfen 10% SE on Thrips

| S. No. | Treatment | Dose Formulation (ml/ha) | Dose a.i./ha (g) | Thrips (per leaf) 5 DAA | 10 DAA | 15 DAA | 30 DAA | Mean | % reduction against control |
|---|---|---|---|---|---|---|---|---|---|
| 1 | Chlorantraniliprole 6% + Spirotetramat 12% + Pyriproxyfen 10% SE | 500 ml | 30 + 60 + 250 | 1.00 (1.22) | 0.67 (1.08) | 1.33 (1.35) | 1.67 (1.47) | 1.17 (1.29) | 96.10 |
| 2 | Chlorantraniliprole 18.5% SC + Spirotetramat 15.31% OD | 150 + 400 | 30 + 60 | 8.33 (2.97) | 9.33 (3.14) | 11.00 (3.39) | 14.67 (3.89) | 10.83 (3.37) | 63.79 |
| 3 | Spirotetramat 15.31% OD + Pyriproxyfen 10% EC | 400 + 500 | 60 + 50 | 4.67 (2.27) | 5.33 (2.41) | 6.33 (2.61) | 8.00 (2.92) | 6.08 (2.57) | 79.67 |
| 4 | Chlorantraniliprole 18.5% SC + Pyriproxyfen 10% EC | 150 + 500 | 30 + 50 | 5.33 (2.41) | 5.67 (2.48) | 7.00 (2.74) | 9.00 (3.08) | 6.75 (2.69) | 77.44 |
| 5 | Spirotetramat 15.31% OD | 400 | 60 | 9.00 (3.08) | 9.67 (3.19) | 12.00 (3.54) | 15.67 (4.02) | 11.59 (3.48) | 61.28 |
| 6 | Chlorantraniliprole 18.5% SC | 150 | 30 | 16.00 (4.06) | 19.67 (4.49) | 25.33 (5.08) | 37.67 (6.18) | 24.67 (5.02) | 17.55 |
| 7 | Pyriproxyfen 10% EC | 500 | 50 | 5.33 (2.41) | 6.00 (2.55) | 7.67 (2.86) | 9.67 (3.19) | 7.17 (2.77) | 76.04 |

TABLE 19-continued

Efficacy of combination of Chlorantraniliprole 6% + Spirotetramat 12% + Pyriproxyfen 10% SE on Thrips

| S. No. | Treatment | Dose Formulation (ml/ha) | Dose a.i./ha (g) | Thrips (per leaf) 5 DAA | 10 DAA | 15 DAA | 30 DAA | Mean | % reduction against control |
|---|---|---|---|---|---|---|---|---|---|
| 8 | Control | — | — | 19.33 (4.45) | 24.00 (4.95) | 30.67 (5.58) | 45.67 (6.79) | 29.92 (5.52) | — |
| | SE(m)± | — | — | 0.470 | 0.601 | 0.771 | 1.185 | 0.756 | — |
| | C.D. 5% | — | — | 1.438 | 1.841 | 2.361 | 3.630 | 2.314 | — |

Figure in parenthesis represents square root transformed value;
SEm±: Standard errors of means;
CD@5%: Critical Difference

TABLE 20

Efficacy of combination of Chlorantraniliprole 6% + Spirotetramat 12% + Pyriproxyfen 10% SE on Mites

| S. No. | Treatment | Dose Formulation (ml/ha) | Dose a.i./ha (g) | Mites (per leaf) 5 DAA | 10 DAA | 15 DAA | 30 DAA | Mean | % reduction against control |
|---|---|---|---|---|---|---|---|---|---|
| 1 | Chlorantraniliprole 6% + Spirotetramat 12% + Pyriproxyfen 10% SE | 500 ml | 30 + 60 + 250 | 2.00 (1.58) | 2.00 (1.58) | 3.00 (1.87) | 3.67 (2.04) | 2.67 (1.78) | 80.60 |
| 2 | Chlorantraniliprole 18.5% SC + Spirotetramat 15.31% OD | 150 + 400 | 30 + 60 | 5.00 (2.35) | 5.33 (2.41) | 6.67 (2.68) | 8.33 (2.97) | 6.33 (2.61) | 53.95 |
| 3 | Spirotetramat 15.31% OD + Pyriproxyfen 10% EC | 400 + 500 | 60 + 50 | 5.33 (2.41) | 4.67 (2.27) | 6.00 (2.55) | 7.67 (2.86) | 5.92 (2.53) | 56.96 |
| 4 | Chlorantraniliprole 18.5% SC + Pyriproxyfen 10% EC | 150 + 500 | 30 + 50 | 7.00 (2.74) | 8.33 (2.97) | 9.67 (3.19) | 11.67 (3.49) | 9.17 (3.11) | 33.33 |
| 5 | Spirotetramat 15.31% OD | 400 | 60 | 5.33 (2.41) | 5.00 (2.35) | 6.33 (2.61) | 7.67 (2.86) | 6.08 (2.57) | 55.76 |
| 6 | Chlorantraniliprole 18.5% SC | 150 | 30 | 7.67 (2.86) | 10.00 (3.24) | 12.33 (3.58) | 16.67 (4.14) | 11.67 (3.49) | 15.15 |
| 7 | Pyriproxyfen 10% EC | 500 | 50 | 6.67 (2.68) | 8.33 (2.97) | 11.00 (3.39) | 14.00 (3.81) | 10.00 (3.24) | 27.27 |
| 8 | Control | — | — | 8.67 (3.03) | 11.33 (3.44) | 14.33 (3.85) | 20.67 (4.60) | 13.75 (3.77) | — |
| | SE(m)± | — | — | 0.156 | 0.239 | 0.290 | 0.426 | 0.275 | — |
| | C.D. 5% | — | — | 0.478 | 0.731 | 0.887 | 1.304 | 0.843 | — |

Figure in parenthesis represents square root transformed value;
SEm±: Standard errors of means;
CD@5%: Critical Difference

TABLE 21

Efficacy of combination of Chlorantraniliprole 6% + Spirotetramat 12% + Pyriproxyfen 10% SE on fruit borer damage and marketable fruit yield

| S. No. | Treatment | Dose Formulation (ml/ha) | Dose a.i./ha (g) | % Damage (Chilli Fruit Borer) $1^{st}$ Picking | $2^{nd}$ Picking | $3^{rd}$ Picking | $4^{th}$ Picking | Mean | % reduction against control | Marketable Fruit Yield (q/ha) |
|---|---|---|---|---|---|---|---|---|---|---|
| 1 | Chlorantraniliprole 6% + Spirotetramat 12% + Pyriproxyfen 10% SE | 500 ml | 30 + 60 + 250 | 3.59 (10.92) | 4.04 (11.60) | 4.39 (12.09) | 4.97 (12.88) | 4.25 (11.90) | 85.69 | 29.8 |
| 2 | Chlorantraniliprole 18.5% SC + Spirotetramat 15.31% OD | 150 + 400 | 30 + 60 | 8.37 (16.82) | 8.65 (17.10) | 10.88 (19.26) | 12.96 (21.10) | 10.22 (18.64) | 65.59 | 25.81 |

TABLE 21-continued

Efficacy of combination of Chlorantraniliprole 6% + Spirotetramat 12% + Pyriproxyfen 10% SE on fruit borer damage and marketable fruit yield

| S. No. | Treatment | Dose Formulation (ml/ha) | Dose a.i./ha (g) | % Damage (Chilli Fruit Borer) 1st Picking | 2nd Picking | 3rd Picking | 4th Picking | Mean | % reduction against control | Marketable Fruit Yield (q/ha) |
|---|---|---|---|---|---|---|---|---|---|---|
| 3 | Spirotetramat 15.31% OD + Pyriproxyfen 10% EC | 400 + 500 | 60 + 50 | 16.02 (23.59) | 17.86 (25.00) | 19.10 (25.91) | 20.48 (26.91) | 18.37 (25.38) | 38.14 | 23.48 |
| 4 | Chlorantraniliprole 18.5% SC + Pyriproxyfen 10% EC | 150 + 500 | 30 + 50 | 8.50 (16.95) | 9.33 (17.79) | 12.04 (20.30) | 13.90 (21.89) | 10.94 (19.31) | 63.14 | 23.91 |
| 5 | Spirotetramat 15.31% OD | 400 | 60 | 17.96 (25.07) | 19.61 (26.28) | 21.02 (27.29) | 24.58 (29.72) | 20.79 (27.13) | 29.96 | 23.42 |
| 6 | Chlorantraniliprole 18.5% SC | 150 | 30 | 10.37 (18.79) | 10.85 (19.23) | 11.86 (20.14) | 12.48 (20.69) | 11.39 (19.72) | 61.63 | 23.88 |
| 7 | Pyriproxyfen 10% EC | 500 | 50 | 18.41 (25.41) | 22.39 (28.24) | 25.81 (30.53) | 28.90 (32.52) | 23.88 (29.25) | 19.57 | 21.68 |
| 8 | Control | — | — | 23.52 (29.01) | 28.70 (32.39) | 31.20 (33.96) | 35.33 (36.47) | 29.69 (33.02) | — | 17.26 |
| | SE(m)± | — | — | 0.508 | 0.633 | 0.675 | 0.763 | 0.643 | — | 0.270 |
| | C.D. 5% | — | — | 1.555 | 1.938 | 2.067 | 2.337 | 1.968 | — | 0.826 |

Figure in parenthesis represents arc sin transformed value;
SEm±: Standard errors of means;
CD@5%: Critical Difference It is evident from the above tables that the insecticidal composition of the present invention gave good control of insects compared to the reference products (solo or binary composition).

Evaluation of Synergistic Effect

A synergistic effect exists whenever the action of an active ingredient combination is greater than the sum of the actions of the individual components. Synergism was calculated by using Colby's method, *Weeds*, vol. 15 No. 1 (January 1967), pp. 20-2.

The synergistic action expected for a given combination of two active components can be calculated as follows:

$$E = (X + Y) - \frac{(XY)}{100}$$

The synergistic action expected for a given combination of three active components can be calculated as follows:

$$E = (X + Y + Z) - \frac{(XY + YZ + XZ)}{100} + \frac{XYZ}{10000}$$

Where:

E represents expected percentage of control for the combination of the two/three active ingredients at defined doses (for example equal to x, y and z respectively), X is the percentage of control observed by the compound (I) at a defined dose (equal to x), Y is the percentage of control observed by the compound (II) at a defined dose (equal to y), Z is the percentage of control observed by the compound (III) at a defined dose (equal to z).

If observed control of the combination>Expected control, the combination is synergistic If observed control of the combination<Expected control, the combination is antagonistic If observed control of the combination=Expected control, the combination is additive

TABLE 22

Synergistic effect of Chlorantraniliprole 6% + Spirotetramat 12% + Buprofezin 10% SC against Thrips

| S. No. | Treatment | Dose Formulation (g/ml/ha) | Dose a.i./ha (g) | % reduction against control (observed) | % reduction expected (using Colby's formula) |
|---|---|---|---|---|---|
| 1 | Chlorantraniliprole 6% + Spirotetramat 12% + Buprofezin 10% SC | 500 ml | 30 + 60 + 50 | 84.12 | 81.68 |
| 2 | Chlorantraniliprole 18.5% SC + Spirotetramat 15.31% OD | 150 + 400 | 30 + 60 | 63.79 | 68.07 |
| 3 | Spirotetramat 15.31% OD + Buprofezin 25% SC | 400 + 200 | 60 + 50 | 69.08 | 77.78 |
| 4 | Chlorantraniliprole 18.5% SC + Buprofezin 25% SC | 150 + 200 | 30 + 50 | 45.13 | 52.69 |
| 5 | Chlorantraniliprole 18.5% SC | 150 | 30 | 17.55 | — |
| 6 | Spirotetramat 15.31% OD | 400 | 60 | 61.28 | — |
| 7 | Buprofezin 25% SC | 200 | 50 | 42.62 | — |

TABLE 23

| Synergistic effect of Chlorantraniliprole 6% + Spirotetramat 12% + Buprofezin 10% SC against Mites | | | | | |
|---|---|---|---|---|---|
| S. No. | Treatment | Dose Formulation (g/ml/ha) | Dose a.i./ha (g) | % reduction against control (observed) | % reduction expected (using Colby's formula) |
| 1 | Chlorantraniliprole 6% + Spirotetramat 12% + Buprofezin 10% SC | 500 ml | 30 + 60 + 50 | 80.60 | 73.38 |
| 2 | Chlorantraniliprole 18.5% SC + Spirotetramat 15.31% OD | 150 + 400 | 30 + 60 | 53.95 | 62.46 |
| 3 | Spirotetramat 15.31% OD + Buprofezin 25% SC | 400 + 200 | 60 + 50 | 60.60 | 68.63 |
| 4 | Chlorantraniliprole 18.5% SC + Buprofezin 25% SC | 150 + 200 | 30 + 50 | 35.15 | 39.83 |
| 5 | Chlorantraniliprole 18.5% SC | 150 | 30 | 15.15 | — |
| 6 | Spirotetramat 15.31% OD | 400 | 60 | 55.76 | — |
| 7 | Buprofezin 25% SC | 200 | 50 | 29.09 | — |

TABLE 24

| Synergistic effect of Chlorantraniliprole 6% + Spirotetramat 12% + Buprofezin 10% SC on % damage due to fruit borer | | | | | |
|---|---|---|---|---|---|
| S. No. | Treatment | Dose Formulation (g/ml/ha) | Dose a.i./ha (g) | % reduction against control (observed) | % reduction expected (using Colby's formula) |
| 1 | Chlorantraniliprole 6% + Spirotetramat 12% + Buprofezin 10% SC | 500 ml | 30 + 60 + 50 | 88.11 | 78.58 |
| 2 | Chlorantraniliprole 18.5% SC + Spirotetramat 15.31% OD | 150 + 400 | 30 + 60 | 65.59 | 73.13 |
| 3 | Spirotetramat 15.31% OD + Buprofezin 25 % SC | 400 + 200 | 60 + 50 | 39.25 | 44.18 |
| 4 | Chlorantraniliprole 18.5% SC + Buprofezin 25% SC | 150 + 200 | 30 + 50 | 64.03 | 69.42 |
| 5 | Chlorantraniliprole 18.5% SC | 150 | 30 | 61.63 | — |
| 6 | Spirotetramat 15.31% OD | 400 | 60 | 29.96 | — |
| 7 | Buprofezin 25% SC | 200 | 50 | 20.29 | — |

It is evident from table 22-24 that the observed control is more than the expected control, hence, the composition of present invention is synergistic.

Phytotoxicity Observations

For phytotoxicity evaluation on Chilli crop, following observations were made by observing temporary or long lasting damage to the leaves if any viz., leaf injury on tips and leaf surface, wilting, vein clearing, necrosis, epinasty and hyponasty at 5, 10, 15, 30 days after application. Crop injury was observed on visual rating from 0-10 scale as given in Table 25 provides treatment details and phytotoxic effect of the synergistic composition of the Chlorantraniliprole 6%+Spirotetramat 12%+Buprofezin 10% SC on chilli crop.

TABLE 25

| Phytotoxic effect of composition Chlorantraniliprole 6% + Spirotetramat 12% + Buprofezin 10% SC | | | | | | | |
|---|---|---|---|---|---|---|---|
| Treatments | Details of Treatment | Dose/ha | Epinasty | Hyponasty | Necrosis | Vein clearing | Wilting |
| T1 | Chlorantraniliprole 6% + Spirotetramat 12% + Buprofezin 10% SC | 500 ml/ha | 0 | 0 | 0 | 0 | 0 |
| T2 | Chlorantraniliprole 6% + Spirotetramat 12% + Buprofezin 10% SC | 750 ml/ha | 0 | 0 | 0 | 0 | 0 |
| T3 | Chlorantraniliprole 6% + Spirotetramat 12% + Buprofezin 10% SC | 1000 ml/ha | 0 | 0 | 0 | 0 | 0 |
| T4 | Control | | 0 | 0 | 0 | 0 | 0 |

0-No Phyto-toxicity

10-Complete kill the plant

TABLE 26

Synergistic effect of Chlorantraniliprole 3% + Spirotetramat 6% + Buprofezin 20% SC against Thrips

| S. No. | Treatment | Dose Formulation (g/ml/ha) | Dose a.i./ha (g) | % reduction against control (observed) | % reduction expected (using Colby's formula) |
|---|---|---|---|---|---|
| 1 | Chlorantraniliprole 3% + Spirotetramat 6% + Buprofezin 20% SC | 1000 ml | 30 + 60 + 100 | 88.58 | 83.81 |
| 2 | Chlorantraniliprole 18.5% SC + Spirotetramat 15.31% OD | 150 + 400 | 30 + 60 | 63.79 | 68.07 |
| 3 | Spirotetramat 15.31% OD + Buprofezin 25% SC | 400 + 400 | 60 + 100 | 72.70 | 80.37 |
| 4 | Chlorantraniliprole 18.5% SC + Buprofezin 25% SC | 150 + 400 | 30 + 100 | 51.81 | 58.20 |
| 5 | Chlorantraniliprole 18.5% SC | 150 | 30 | 17.55 | — |
| 6 | Spirotetramat 15.31% OD | 400 | 60 | 61.28 | — |
| 7 | Buprofezin 25% SC | 400 | 100 | 49.30 | — |

TABLE 27

Synergistic effect of Chlorantraniliprole 3% + Spirotetramat 6% + Buprofezin 20% SC against Mites

| S. No. | Treatment | Dose Formulation (g/ml/ha) | Dose a.i./ha (g) | % reduction against control (observed) | % reduction expected (using Colby's formula) |
|---|---|---|---|---|---|
| 1 | Chlorantraniliprole 3% + Spirotetramat 6% + Buprofezin 20% SC | 1000 ml | 30 + 60 + 100 | 86.67 | 77.02 |
| 2 | Chlorantraniliprole 18.5% SC + Spirotetramat 15.31% OD | 150 + 400 | 30 + 60 | 53.95 | 62.46 |
| 3 | Spirotetramat 15.31% OD + Buprofezin 25% SC | 400 + 400 | 60 + 100 | 69.71 | 72.92 |
| 4 | Chlorantraniliprole 18.5% SC + Buprofezin 25% SC | 150 + 400 | 30 + 100 | 45.45 | 48.05 |
| 5 | Chlorantraniliprole 18.5% SC | 150 | 30 | 15.15 | — |
| 6 | Spirotetramat 15.31% OD | 400 | 60 | 55.76 | — |
| 7 | Buprofezin 25% SC | 400 | 100 | 38.78 | — |

TABLE 28

Synergistic effect of Chlorantraniliprole 3% + Spirotetramat 6% + Buprofezin 20% SC on % damage due to fruit borer

| S. No. | Treatment | Dose Formulation (g/ml/ha) | Dose a.i./ha (g) | % reduction against control (observed) | % reduction expected (using Colby's formula) |
|---|---|---|---|---|---|
| 1 | Chlorantraniliprole 3% + Spirotetramat 6% + Buprofezin 20% SC | 1000 ml | 30 + 60 + 100 | 89.66 | 80.94 |
| 2 | Chlorantraniliprole 18.5% SC + Spirotetramat 15.31% OD | 150 + 400 | 30 + 60 | 65.59 | 73.13 |
| 3 | Spirotetramat 15.31% OD + Buprofezin 25 % SC | 400 + 400 | 60 + 100 | 44.72 | 50.31 |
| 4 | Chlorantraniliprole 18.5% SC + Buprofezin 25% SC | 150 + 400 | 30 + 100 | 66.19 | 72.78 |
| 5 | Chlorantraniliprole 18.5% SC | 150 | 30 | 61.63 | — |
| 6 | Spirotetramat 15.31% OD | 400 | 60 | 29.96 | — |
| 7 | Buprofezin 25% SC | 400 | 100 | 29.05 | — |

It is evident from table 26-28 that the observed control is more than the expected control, hence, the composition of present invention is synergistic.

Table 29 provides treatment details and phytotoxic effect of the synergistic composition of the Chlorantraniliprole 3%+Spirotetramat 6%+Buprofezin 20% SC on chilli crop.

TABLE 29

Phytotoxic effect of composition Chlorantraniliprole 3% + Spirotetramat 6% + Buprofezin 20% SC

| Treatments | Details of Treatment | Dose/ ha | Epinasty | Hyponasty | Necrosis | Vein clearing | Wilting |
|---|---|---|---|---|---|---|---|
| T1 | Chlorantraniliprole 3% + Spirotetramat 6% + Buprofezin 20% SC | 1000 ml/ha | 0 | 0 | 0 | 0 | 0 |
| T2 | Chlorantraniliprole 3% + Spirotetramat 6% + Buprofezin 20% SC | 1500 ml/ha | 0 | 0 | 0 | 0 | 0 |

TABLE 29-continued

| Phytotoxic effect of composition Chlorantraniliprole 3% + Spirotetramat 6% + Buprofezin 20% SC | | | | | | | |
|---|---|---|---|---|---|---|---|
| Treatments | Details of Treatment | Dose/ ha | Epinasty | Hyponasty | Necrosis | Vein clearing | Wilting |
| T3 | Chlorantraniliprole 3% + Spirotetramat 6% + Buprofezin 20% SC | 2000 ml/ha | 0 | 0 | 0 | 0 | 0 |
| T4 | Control | — | 0 | 0 | 0 | 0 | 0 |

0-No Phyto-toxicity

10-Complete kill the plant

TABLE 30

| Synergistic effect of Chlorantraniliprole 6% + Spirotetramat 12% + Bifenthrin 10% SC against Thrips | | | | | |
|---|---|---|---|---|---|
| S. No. | Treatment | Dose Formulation (g/ml/ha) | Dose a.i./ha (g) | % reduction against control (observed) | % reduction expected (using Colby's formula) |
| 1 | Chlorantraniliprole 6% + Spirotetramat 12% + Bifenthrin 10% SC | 500 ml | 30 + 60 + 50 | 82.18 | 75.9 |
| 2 | Chlorantraniliprole 18.5% SC + Spirotetramat 15.31% OD | 150 + 400 | 30 + 60 | 63.79 | 68.09 |
| 3 | Spirotetramat 15.31% OD + Bifenthrin 10 % EC | 400 + 500 | 60 + 50 | 66.01 | 75.77 |
| 4 | Chlorantraniliprole 18.5% SC + Bifenthrin 10% EC | 150 + 500 | 30 + 50 | 37.04 | 37.76 |
| 5 | Chlorantraniliprole 18.5% SC | 150 | 30 | 17.55 | — |
| 6 | Spirotetramat 15.31% OD | 400 | 60 | 61.28 | — |
| 7 | Bifenthrin 10% EC | 500 | 50 | 24.52 | — |

TABLE 31

| Synergistic effect of Chlorantraniliprole 6% + Spirotetramat 12% + Bifenthrin 10% SC against Mites | | | | | |
|---|---|---|---|---|---|
| S. No. | Treatment | Dose Formulation (g/ml/ha) | Dose a.i./ha (g) | % reduction against control (observed) | % reduction expected (using Colby's formula) |
| 1 | Chlorantraniliprole 6% + Spirotetramat 12% + Bifenthrin 10% SC | 500 ml | 30 + 60 + 50 | 90.91 | 84.76 |
| 2 | Chlorantraniliprole 18.5% SC + Spirotetramat 15.31% OD | 150 + 400 | 30 + 60 | 53.95 | 62.46 |
| 3 | Spirotetramat 15.31% OD + Bifenthrin 10% EC | 400 + 500 | 60 + 50 | 73.33 | 82.04 |
| 4 | Chlorantraniliprole 18.5% SC + Bifenthrin 10% EC | 150 + 500 | 30 + 50 | 60.00 | 65.55 |
| 5 | Chlorantraniliprole 18.5% SC | 150 | 30 | 15.15 | — |
| 6 | Spirotetramat 15.31% OD | 400 | 60 | 55.76 | — |
| 7 | Bifenthrin 10% EC | 500 | 50 | 59.40 | — |

TABLE 32

| Synergistic effect of Chlorantraniliprole 6% + Spirotetramat 12% + Bifenthrin 10% SC on % damage due to fruit borer | | | | | |
|---|---|---|---|---|---|
| S. No. | Treatment | Dose Formulation (g/ml/ha) | Dose a.i./ha (g) | % reduction against control (observed) | % reduction expected (using Colby's formula) |
| 1 | Chlorantraniliprole 6% + Spirotetramat 12% + Bifenthrin 10% SC | 500 ml | 30 + 60 + 50 | 31.52 | 85.41 |
| 2 | Chlorantraniliprole 18.5% SC + Spirotetramat 15.31% OD | 150 + 400 | 30 + 60 | 25.81 | 73.13 |
| 3 | Spirotetramat 15.31% OD + Bifenthrin 10% EC | 400 + 500 | 60 + 50 | 24.93 | 61.97 |
| 4 | Chlorantraniliprole 18.5% SC + Bifenthrin 10% EC | 150 + 500 | 30 + 50 | 25.20 | 79.17 |
| 5 | Chlorantraniliprole 18.5% SC | 150 | 30 | 23.88 | — |
| 5 | Spirotetramat 15.31% OD | 400 | 60 | 23.42 | — |
| 7 | Bifenthrin 10% EC | 500 | 50 | 23.02 | — |

It is evident from table 30-32 that the observed control is more than the expected control, hence, the composition of present invention is synergistic.

Table 33 provides treatment details and phytotoxic effect of the synergistic composition of the Chlorantraniliprole 6%+Spirotetramat 12%+Bifenthrin 10% SC on chilli crop.

TABLE 33

Phytotoxic effect of composition Chlorantraniliprole 6% + Spirotetramat 12% + Bifenthrin 10% SC

| Treatments | Details of Treatment | Dose/ ha | Epinasty | Hyponasty | Necrosis | Vein clearing | Wilting |
|---|---|---|---|---|---|---|---|
| T1 | Chlorantraniliprole 6% + Spirotetramat 12% + Bifenthrin 10% SC | 500 ml/ha | 0 | 0 | 0 | 0 | 0 |
| T2 | Chlorantraniliprole 6% + Spirotetramat 12% + Bifenthrin 10% SC | 750 ml/ha | 0 | 0 | 0 | 0 | 0 |
| T3 | Chlorantraniliprole 6% + Spirotetramat 12% + Bifenthrin 10% SC | 1000 ml/ha | 0 | 0 | 0 | 0 | 0 |
| T4 | Control | — | 0 | 0 | 0 | 0 | 0 |

0-No Phyto-toxicity

10-Complete kill the plant

TABLE 34

Synergistic effect of Chlorantraniliprole 6% + Spirotetramat 12% + Propargite 50% SE against Thrips

| S. No. | Treatment | Dose Formulation (g/ml/ha) | Dose a.i./ha (g) | % reduction against control (observed) | % reduction expected (using Colby's formula) |
|---|---|---|---|---|---|
| 1 | Chlorantraniliprole 6% + Spirotetramat 12% + Propargite 50% SE | 500 ml | 30 + 60 + 250 | 76.60 | 71.27 |
| 2 | Chlorantraniliprole 18.5% SC + Spirotetramat 15.31% OD | 150 + 400 | 30 + 60 | 63.79 | 68.07 |
| 3 | Spirotetramat 15.31% OD + Propargite 57% EC | 400 + 441.2 | 60 + 250 | 61.28 | 65.16 |
| 4 | Chlorantraniliprole 18.5% SC + Propargite 57% EC | 150 + 441.2 | 30 + 250 | 24.79 | 25.82 |
| 5 | Chlorantraniliprole 18.5% SC | 150 | 30 | 17.55 | — |
| 6 | Spirotetramat 15.31% OD | 400 | 60 | 61.28 | — |
| 7 | Propargite 57% EC | 441.2 | 250 | 10.03 | — |

TABLE 35

Synergistic effect of Chlorantraniliprole 6% + Spirotetramat 12% + Propargite 50% SE against Mites

| S. No. | Treatment | Dose Formulation (g/ml/ha) | Dose a.i./ha (g) | % reduction against control (observed) | % reduction expected (using Colby's formula) |
|---|---|---|---|---|---|
| 1 | Chlorantraniliprole 6% + Spirotetramat 12% + Propargite 50% SE | 500 ml | 30 + 60 + 250 | 96.96 | 92.94 |
| 2 | Chlorantraniliprole 18.5% SC + Spirotetramat 15.31% OD | 150 + 400 | 30 + 60 | 53.95 | 62.46 |
| 3 | Spirotetramat 15.31% OD + Propargite 57% EC | 400 + 441.2 | 60 + 250 | 89.69 | 91.68 |
| 4 | Chlorantraniliprole 18.5% SC + Propargite 57% EC | 150 + 441.2 | 30 + 250 | 82.42 | 84.05 |
| 5 | Chlorantraniliprole 18.5% SC | 150 | 30 | 15.15 | — |
| 6 | Spirotetramat 15.31% OD | 400 | 60 | 55.76 | — |
| 7 | Propargite 57% EC | 441.2 | 250 | 81.20 | — |

TABLE 36

Synergistic effect of Chlorantraniliprole 6% + Spirotetramat 12% + Propargite 50% SE on % damage due to fruit borer

| S. No. | Treatment | Dose Formulation (g/ml/ha) | Dose a.i./ha (g) | % reduction against control (observed) | % reduction expected (using Colby's formula) |
|---|---|---|---|---|---|
| 1 | Chlorantraniliprole 6% + Spirotetramat 12% + Propargite 50% SE | 500 ml | 30 + 60 + 250 | 80.13 | 74.71 |
| 2 | Chlorantraniliprole 18.5% SC + Spirotetramat 15.31% OD | 150 + 400 | 30 + 60 | 65.59 | 73.13 |
| 3 | Spirotetramat 15.31% OD + Propargite 57% EC | 400 + 441.2 | 60 + 250 | 26.69 | 34.09 |
| 4 | Chlorantraniliprole 18.5% SC + Propargite 57% EC | 150 + 441.2 | 30 + 250 | 56.06 | 63.89 |
| 5 | Chlorantraniliprole 18.5% SC | 150 | 30 | 61.63 | — |
| 6 | Spirotetramat 15.31% OD | 400 | 60 | 29.96 | — |
| 7 | Propargite 57% EC | 441.2 | 250 | 5.89 | — |

It is evident from table 34-36 that the observed control is more than the expected control, hence, the composition of present invention is synergistic.

Table 37 provides treatment details and phytotoxic effect of the synergistic composition of the Chlorantraniliprole 6%+Spirotetramat 12%+Propargite 50% SE on chilli crop.

TABLE 37

Phytotoxic effect of composition Chlorantraniliprole 6% + Spirotetramat 12% + Propargite 50% SE

| Treatments | Details of Treatment | Dose/ ha | Epinasty | Hyponasty | Necrosis | Vein clearing | Wilting |
|---|---|---|---|---|---|---|---|
| T1 | T1- Chlorantraniliprole 6% + Spirotetramat 12% + Propargite 50% SE | 500 ml/ha | 0 | 0 | 0 | 0 | 0 |
| T2 | T2- Chlorantraniliprole 6% + Spirotetramat 12% + Propargite 50% SE | 750 ml/ha | 0 | 0 | 0 | 0 | 0 |
| T3 | T3- Chlorantraniliprole 6% + Spirotetramat 12% + Propargite 50% SE | 1000 ml/ha | 0 | 0 | 0 | 0 | 0 |
| T4 | Control | — | 0 | 0 | 0 | 0 | 0 |

0-No Phyto-toxicity

10-Complete kill the plant

TABLE 38

Synergistic effect of Chlorantraniliprole 6% + Spirotetramat 12% + Pyriproxyfen 10% SE against Thrips

| S. No. | Treatment | Dose Formulation (g/ml/ha) | Dose a.i./ha (g) | % reduction against control (observed) | % reduction expected (using Colby's formula) |
|---|---|---|---|---|---|
| 1 | Chlorantraniliprole 6% + Spirotetramat 12% + Pyriproxyfen 10% SE | 500 ml | 30 + 60 + 250 | 96.10 | 92.35 |
| 2 | Chlorantraniliprole 18.5% SC + Spirotetramat 15.31% OD | 150 + 400 | 30 + 60 | 63.79 | 68.07 |
| 3 | Spirotetramat 15.31% OD + Pyriproxyfen 10% EC | 400 + 500 | 60 + 50 | 79.67 | 90.72 |
| 4 | Chlorantraniliprole 18.5% SC + Pyriproxyfen 10% EC | 150 + 500 | 30 + 50 | 77.44 | 80.24 |
| 5 | Chlorantraniliprole 18.5% SC | 150 | 30 | 17.55 | — |
| 6 | Spirotetramat 15.31% OD | 400 | 60 | 61.28 | — |
| 7 | Pyriproxyfen 10% EC | 500 | 50 | 76.04 | — |

TABLE 39

| Synergistic effect of Chlorantraniliprole 6% + Spirotetramat 12% + Pyriproxyfen 10% SE against Mites | | | | | |
|---|---|---|---|---|---|
| S. No. | Treatment | Dose Formulation (g/ml/ha) | Dose a.i./ha (g) | % reduction against control (observed) | % reduction expected (using Colby's formula) |
| 1 | Chlorantraniliprole 6% + Spirotetramat 12% + Pyriproxyfen 10% SE | 500 ml | 30 + 60 + 250 | 80.60 | 72.7 |
| 2 | Chlorantraniliprole 18.5% SC + Spirotetramat 15.31% OD | 150 + 400 | 30 + 60 | 53.95 | 62.46 |
| 3 | Spirotetramat 15.31% OD + Pyriproxyfen 10% EC | 400 + 500 | 60 + 50 | 56.96 | 67.83 |
| 4 | Chlorantraniliprole 18.5% SC + Pyriproxyfen 10% EC | 150 + 500 | 30 + 50 | 33.33 | 38.29 |
| 5 | Chlorantraniliprole 18.5% SC | 150 | 30 | 15.15 | — |
| 6 | Spirotetramat 15.31% OD | 400 | 60 | 55.76 | — |
| 7 | Pyriproxyfen 10% EC | 500 | 50 | 27.27 | — |

TABLE 40

| Synergistic effect of Chlorantraniliprole 6% + Spirotetramat 12% + Pyriproxyfen 10% SE on % damage due to fruit borer | | | | | |
|---|---|---|---|---|---|
| S. No. | Treatment | Dose Formulation (g/ml/ha) | Dose a.i./ha (g) | % reduction against control (observed) | % reduction expected (using Colby's formula) |
| 1 | Chlorantraniliprole 6% + Spirotetramat 12% + Pyriproxyfen 10% SE | 500 ml | 30 + 60 + 250 | 29.8 | 78.39 |
| 2 | Chlorantraniliprole 18.5% SC + Spirotetramat 15.31% OD | 150 + 400 | 30 + 60 | 25.81 | 73.13 |
| 3 | Spirotetramat 15.31% OD + Pyriproxyfen 10% EC | 400 + 500 | 60 + 50 | 23.48 | 43.67 |
| 4 | Chlorantraniliprole 18.5% SC + Pyriproxyfen 10% EC | 150 + 500 | 30 + 50 | 23.91 | 69.14 |
| 5 | Chlorantraniliprole 18.5% SC | 150 | 30 | 23.88 | — |
| 6 | Spirotetramat 15.31% OD | 400 | 60 | 23.42 | — |
| 7 | Pyriproxyfen 10% EC | 500 | 50 | 21.68 | — |

It is evident from table 38-40 that the observed control is more than the expected control, hence, the composition of present invention is synergistic.

Table 41 provides treatment details and phytotoxic effect of the synergistic composition of the Chlorantraniliprole 6%+Spirotetramat 12%+Pyriproxyfen 10% SE on chilli crop.

TABLE 41

| Phytotoxic effect of composition Chlorantraniliprole 6% + Spirotetramat 12% + Pyriproxyfen 10% SE | | | | | | | |
|---|---|---|---|---|---|---|---|
| Treatments | Details of Treatment | Dose/ha | Epinasty | Hyponasty | Necrosis | Vein clearing | Wilting |
| T1 | T1-Chlorantraniliprole 6% + Spirotetramat 12% + Pyriproxyfen 10% SE | 500 ml/ha | 0 | 0 | 0 | 0 | 0 |
| T2 | T2-Chlorantraniliprole 6% + Spirotetramat 12% + Pyriproxyfen 10% SE | 750 ml/ha | 0 | 0 | 0 | 0 | 0 |
| T3 | T3-Chlorantraniliprole 6% + Spirotetramat 12% + Pyriproxyfen 10% SE | 1000 ml/ha | 0 | 0 | 0 | 0 | 0 |
| T4 | Control | — | 0 | 0 | 0 | 0 | 0 |

0-No Phyto-toxicity
10-Complete kill the plant

From the foregoing it will be observed that numerous modifications and variations can be effectuated without departing from the scope of the novel concepts of the present invention. It is to be understood that no limitations with respect to the specific embodiments illustrated is intended or should be inferred. It should be understood that all such modifications and improvements have been deleted herein for the sake of conciseness and readability but are properly within the scope of the following claims.

We claim:

1. A synergistic insecticidal composition consisting of:

a. chlorantraniliprole;

b. spirotetramat;

c. at least one compound selected from buprofezin, bifenthrin, propargite, or pyriproxyfen; and d. one or more excipients.

2. The synergistic insecticidal composition as claimed in claim 1, consisting of:

1 to 15% w/w of chlorantraniliprole; 5 to 30% w/w of spirotetramat; and 0.1 to 50% w/w of the at least one compound selected from buprofezin, bifenthrin, propargite, or pyriproxyfen.

3. The synergistic insecticidal composition as claimed in claim 2, wherein the at least one compound is:

a. buprofezin present in the range from 5 to 30% w/w;

b. bifenthrin present in the range from 2.5 to 25% w/w;

c. propargite present in the range from 20 to 50% w/w; or d. pyriproxyfen present in the range from 5 to 20% w/w.

4. The synergistic insecticidal composition as claimed in claim 1, wherein the composition is selected from a group consisting of:

a. 6% w/w of chlorantraniliprole, 12% w/w of spirotetramat; 10% w/w of buprofezin and one or more excipients;

b. 3% w/w of chlorantraniliprole, 6% w/w of spirotetramat; 20% w/w of buprofezin and one or more excipients;

c. 6% w/w of chlorantraniliprole, 12% w/w of spirotetramat; 10% w/w of bifenthrin and one or more excipients;

d. 6% w/w of chlorantraniliprole, 12% w/w of spirotetramat; 50% w/w of propargite and one or more excipients; and e. 6% w/w of chlorantraniliprole, 12% w/w of spirotetramat; 10% w/w of pyriproxyfen and one or more excipients.

5. The synergistic insecticidal composition as claimed in claim 1, wherein the excipient is selected from the group consisting of:

a. dispersing agent present in an amount in the range from 2 to 10% w/w;

b. wetting agent present in an amount in the range from 1 to 5% w/w;

c. emulsifier present in an amount in the range from 2 to 7% w/w;

d. anti-freeze agent present in an amount in the range from 1 to 10% w/w;

e. defoamer present in an amount in the range from 0.01 to 0.5% w/w;

f. biocide present in an amount in the range from 0.01 to 0.5% w/w;

g. thickener present in an amount in the range from 0.01 to 0.5% w/w; and h. solvent present in an amount in the range from 5 to 25% w/w.

6. The synergistic insecticidal composition as claimed in claim 5, wherein:

a. the dispersing agent is selected from the group consisting of amine salt of phosphate tristyryl phenol ethoxylated, acrylic copolymer, acrylic graft copolymer, salt of naphthalene sulphonate, naphthalene sulfonate formaldehyde condensate, phosphate ester, salt of polycarboxylate, alcohol block copolymer, ethoxylated polyarylphenol phosphate ester, tristyrylphenol ethoxylate phosphate ester, and a combination thereof;

b. the wetting agent is selected from the group consisting of ethoxylated polyarylphenol phosphate ester, dioctyl sulphosuccinate, non-ionic ethoxylate, alkylarylpolyglycol ether, castor oil ethoxylate, and a combination thereof;

c. the emulsifier is selected from the group consisting of polyethylene oxide block copolymer, high molecular weight polymer (polyvinyl alcohol), PEG-10 PPG-5 cetyl phosphate, ethylene oxide (EO)-polyethylene oxide (PO) block copolymer, tristyryl phenol, an ethoxylated nonionic emulsifier, a castor oil ethoxylates, a blend of non-ionic-anionic emulsifiers, and a combination thereof;

d. the anti-freeze agent is selected from the group consisting of glycerol, propylene glycol, diethylene glycol, monoethylene glycol, and a combination thereof;

e. the defoamer is selected from the group consisting of silicon emulsion, dimethyl polysiloxane emulsion, polysiloxane emulsion, and a combination thereof;

f. the biocide is selected from the group consisting of 20% aqueous dipropylene glycol solution of 1, 2-benzisothiazolin-3-one, formaldehyde, isothiazolinone, and a combination thereof;

g. the thickener is selected from the group consisting of xanthan gum, welan gum, guar gum, polyvinyl alcohol, carboxymethylcellulose, polyvinylpyrrolidone, carboxyvinyl polymer, acrylic polymer, starch derivative, polysaccharide, high purity silica, white carbon, and a combination thereof; and h. the solvent is selected from the group consisting of naphtha, butan-1-ol, xylene, decanamide, N-methyl-2-pyrrolidone, dimethyl sulfoxide, cyclohexanone, solvent C9, water, and a combination thereof.

7. The synergistic insecticidal composition as claimed in claim 1, wherein the composition is formulated as capsule suspension (CS), dispersible concentrate (DC), dustable powder (DP), powder for dry seed treatment (DS), emulsifiable concentrate (EC), emulsifiable granule (EG), emulsion water-in-oil (EO), emulsifiable powder (EP), emulsion for seed treatment(ES), emulsion oil-in-water (EW), flowable concentrate for seed treatment (FS), granules (GR), micro-emulsion (ME), oil-dispersion (OD), oil miscible flowable concentrate (OF), oil miscible liquid (OL), oil dispersible powder (OP), suspension concentrate (SC), suspension concentrate for direct application (SD), suspo-emulsion (SE), water soluble granule (SG), soluble concentrate (SL), spreading oil (SO), water soluble powder (SP), water soluble tablet (ST), ultra-low volume (ULV) suspension, tablet (TB), ultra-low volume (ULV) liquid, water dispersible granules (WG/WDG), wettable powder (WP), water dispersible powder for slurry seed treatment (WS), water dispersible tablet (WT), a mixed formulation of CS and SC (ZC), a mixed formulation of CS and SE (ZE), or a mixed formulation of CS and EW (ZW).

8. The synergistic insecticidal composition as claimed in claim 7, wherein the composition is formulated as suspension concentrate (SC) or suspo-emulsion (SE).

9. The synergistic insecticidal composition as claimed in claim 1, wherein the composition is in SC form and selected from a group consisting of:

a. 6% w/w of chlorantraniliprole, 12% w/w of spirotetramat, 10% w/w of buprofezin, 5% w/w of propylene glycol, 5% w/w of acrylic graft copolymer, 3% w/w of non-ionic ethoxylate, 0.1% w/w of dimethyl polysiloxane emulsion, 0.1% w/w of 20% aqueous dipropylene glycol solution of 1, 2-benzisothiazolin-3-one, 0.2% w/w of xanthan Gum, and demineralised water;

b. 3% w/w of chlorantraniliprole, 6% w/w of spirotetramat, 20% w/w of buprofezin, 5% w/w of propylene glycol, 5% w/w of acrylic graft copolymer, 3% w/w of non-ionic ethoxylate, 0.1% w/w of dimethyl polysiloxane emulsion, 0.1% w/w 20% of aqueous dipropylene glycol solution of 1, 2-benzisothiazolin-3-one, 0.2% w/w of xanthan gum, and demineralized water; and c. 6% w/w of chlorantraniliprole, 12% w/w of spirotetramat, 10% w/w of bifenthrin, 5% w/w of propylene glycol, 5% w/w of acrylic copolymer, 3% w/w of non-ionic ethoxylate, 0.1% w/w of dimethyl polysiloxane emulsion, 0.1% w/w of 20% aqueous dipropylene glycol solution of 1,2-benzisothiazolin-3-one, 0.2% w/w of xanthan gum, and demineralized water.

10. The synergistic insecticidal composition as claimed in claim 1, wherein the composition is in SE form selected from a group consisting of:

a. 6% w/w of chlorantraniliprole, 12% w/w of spirotetramat, 50% w/w of propargite, 5% w/w of propylene glycol, 3% w/w of acrylic copolymer, 1.5% w/w of phosphate ester1, 8% w/w of solvent (C9), 3% w/w of blend of non-ionic and anionic emulsifier, 3% w/w of tristyryl phenol, 2% w/w of non-ionic ethoxylate, 0.15% w/w of silicone emulsion, 0.15% w/w of 20% aqueous dipropylene glycol solution of 1,2-benzisothiazolin-3-one, 0.1% w/w of xanthan gum, and demineralized water; and b. 6% w/w of chlorantraniliprole, 12% w/w of spirotetramat, 10% w/w of pyriproxyfen, 5% w/w of propylene glycol, 3% w/w of acrylic copolymer, 1.5% w/w of phosphate ester, 15% w/w of solvent (C9), 2% w/w of solvent naptha, 4% w/w of tristyryl phenol, 2% w/w of non-ionic ethoxylate, 0.15% w/w of silicone emulsion, 0.15% w/w of 20% aqueous dipropylene glycol solution of 1,2-benzisothiazolin-3-one, 0.2% w/w of xanthan gum, and demineralized water.

* * * * *